(12) United States Patent
Goto et al.

(10) Patent No.: US 8,764,152 B2
(45) Date of Patent: Jul. 1, 2014

(54) IMAGE PROCESSING APPARATUS AND IMAGE PROCESSING METHOD

(75) Inventors: Fumitaka Goto, Tokyo (JP); Fumihiro Goto, Kawasaki (JP); Akitoshi Yamada, Yokohama (JP); Akihiko Nakatani, Kawasaki (JP); Mitsuhiro Ono, Tokyo (JP); Okinori Tsuchiya, Yokohama (JP); Takashi Fujita, Kawasaki (JP); Rie Kajihara, Minoh (JP); Ayumi Sano, Kawasaki (JP); Tomokazu Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

(21) Appl. No.: 13/039,511

(22) Filed: Mar. 3, 2011

(65) Prior Publication Data

US 2011/0234661 A1    Sep. 29, 2011

(30) Foreign Application Priority Data

Mar. 26, 2010 (JP) ................. 2010-072193

(51) Int. Cl.
*B41J 2/205* (2006.01)
*G06K 15/10* (2006.01)
*G06K 15/02* (2006.01)

(52) U.S. Cl.
CPC ............. *B41J 2/2054* (2013.01); *B41J 2/2056* (2013.01); *G06K 15/107* (2013.01); *G06K 15/02* (2013.01)
USPC .......................................................... 347/15

(58) Field of Classification Search
CPC ...... B41J 19/147; B41J 2/2054; B41J 2/2056; G06K 15/02; G06K 15/107
USPC ..................................... 347/9, 12, 14, 15, 43
See application file for complete search history.

(56) References Cited

U.S. PATENT DOCUMENTS

| 8,405,876 B2 * | 3/2013 | Nakatani et al. .............. 358/3.03 |
| 2011/0122178 A1 | 5/2011 | Goto et al. |

FOREIGN PATENT DOCUMENTS

| JP | 2000-103088 | 4/2000 |
| JP | 2001-150700 | 6/2001 |
| JP | 2001-322262 A | 11/2001 |
| JP | 2005-280276 A | 10/2005 |

* cited by examiner

*Primary Examiner* — An Do
(74) *Attorney, Agent, or Firm* — Fitzpatrick, Cella, Harper & Scinto

(57) ABSTRACT

An image processing apparatus and an image processing method are provided which, when forming an image using a plurality of different inks, can produce a satisfactory image free from problematical levels of density unevenness, graininess and insufficient density with any of these inks. To this end, when printing on pixel areas of a print medium by a plurality of relative movements between the printing unit and the print medium, the dot overlap rate of an ink that tends to show density unevenness is set higher than that of an ink that tends to show other image impairments more conspicuously than the density unevenness. This results in a good image that eliminates such image impairments as density unevenness, graininess and density insufficiency in the entire color gamut.

15 Claims, 35 Drawing Sheets

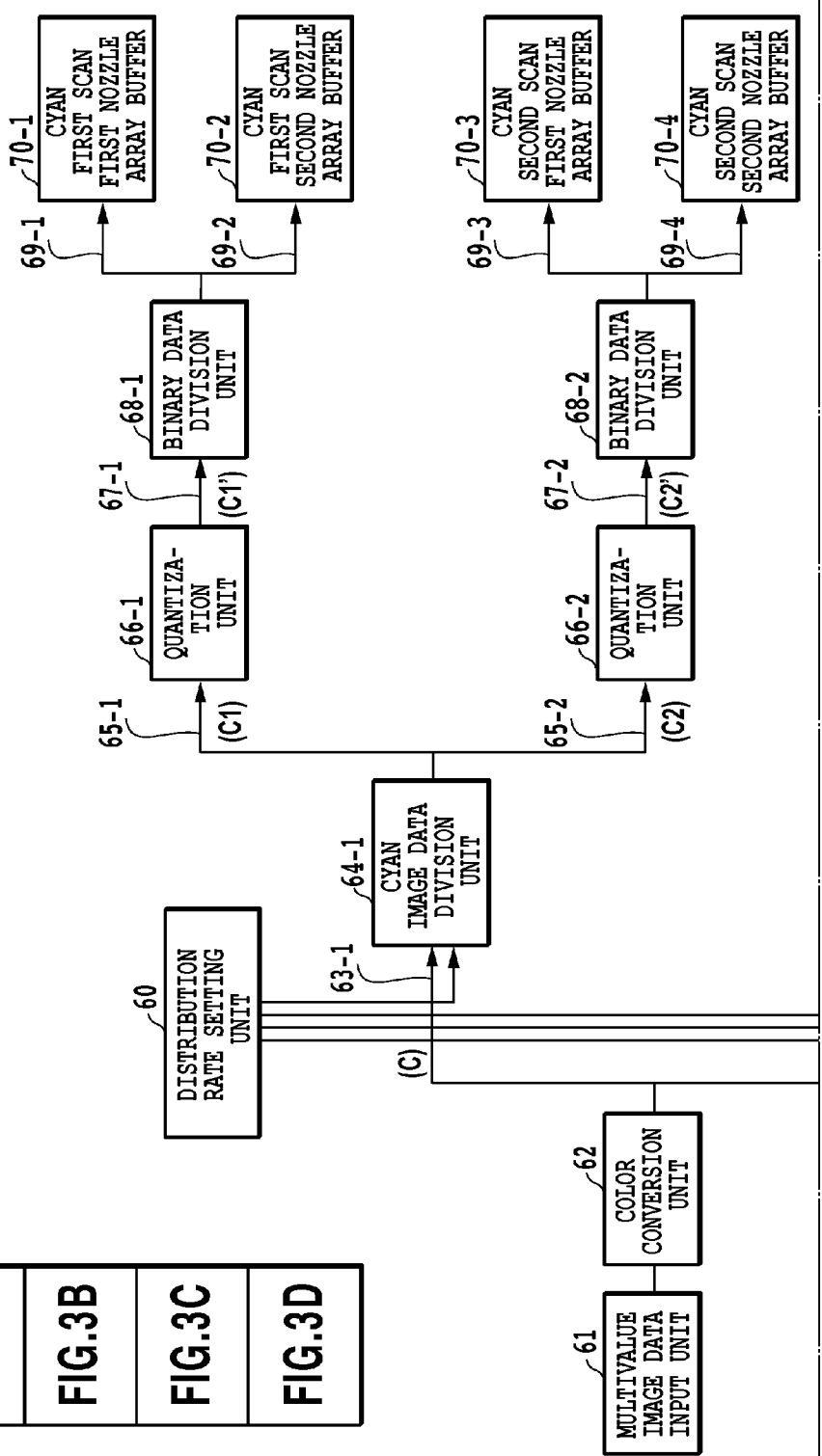

| | FIRST PLANE | SECOND PLANE |
|---|---|---|
| FIG.4A | 1 0 0 1 / 0 1 0 0 / 0 0 1 0 | 0 0 1 0 / 1 0 0 1 / 0 1 0 1 |
| FIG.4B | 1 0 0 1 / 0 1 0 0 / 0 0 1 0 | 0 0 1 0 / 1 1 0 0 / 0 0 0 1 |
| FIG.4C | 1 0 0 1 / 0 1 0 0 / 0 0 1 0 | 0 0 0 1 / 1 1 0 0 / 0 0 1 1 |
| FIG.4D | 1 0 0 1 / 0 1 0 0 / 0 0 1 0 | 1 0 0 1 / 0 1 0 0 / 0 0 1 1 |
| FIG.4E | 1 0 0 1 / 0 1 0 0 / 0 0 1 0 | 1 0 0 1 / 0 1 0 0 / 0 0 1 1 |
| FIG.4F | 1 0 0 1 / 0 1 0 0 / 0 0 1 0 | 1 0 0 1 / 0 1 0 0 / 0 0 1 1 |
| FIG.4G | 1 0 0 1 / 0 1 0 0 / 0 0 1 0 | 0 0 0 0 / 0 1 0 0 / 0 0 0 1 |

| | TOTAL NUMBER OF DOTS | NUMBER OF OVERLAPPING DOTS | DOT OVERLAP RATE (%) |
|---|---|---|---|
| (A) | 8 | 0 | 0 (=0÷8×100) |
| (B) | 8 | 2 | 25 (=2÷8×100) |
| (C) | 8 | 4 | 50 (=4÷8×100) |
| (D) | 8 | 6 | 75 (=6÷8×100) |
| (E) | 8 | 8 | 100 (=8÷8×100) |
| (F) | 7 | 6 | 86 (=6÷7×100) |
| (G) | 6 | 2 | 33 (=2÷6×100) |

FIG.4H

DIFFUSION MATRIX A

|  | ● | 9 | 3 |
|---|---|---|---|
| 5 | 9 | 3 |  |
|  | 3 |  |  |

●REPRESENTS A PIXEL TO BE PROCESSED

FIG.8A

DIFFUSION MATRIX B

|  |  | ● | 2 | 1 |
|---|---|---|---|---|
| 1 | 1 | 2 | 1 |  |

●REPRESENTS A PIXEL TO BE PROCESSED

FIG.8B

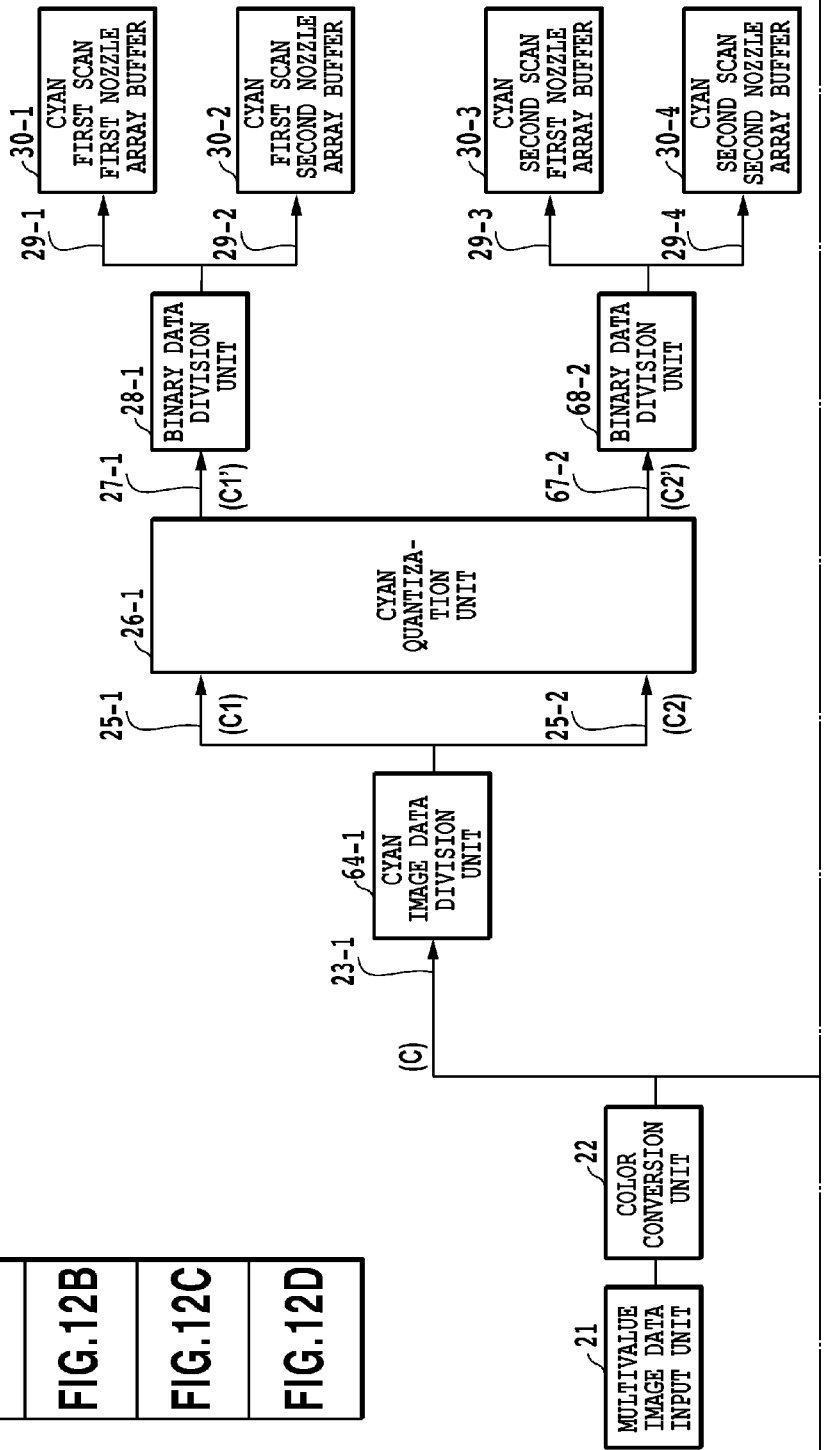

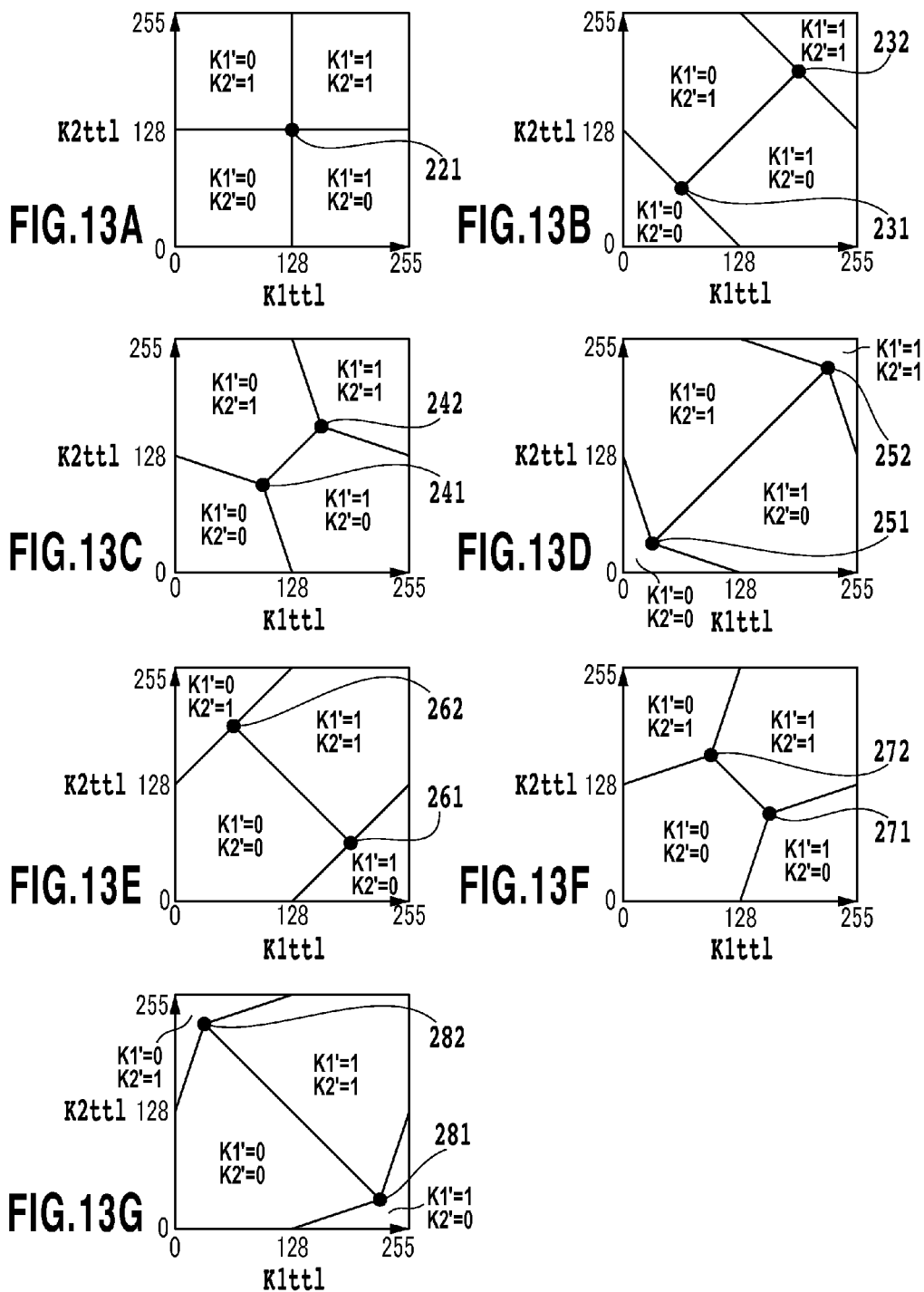

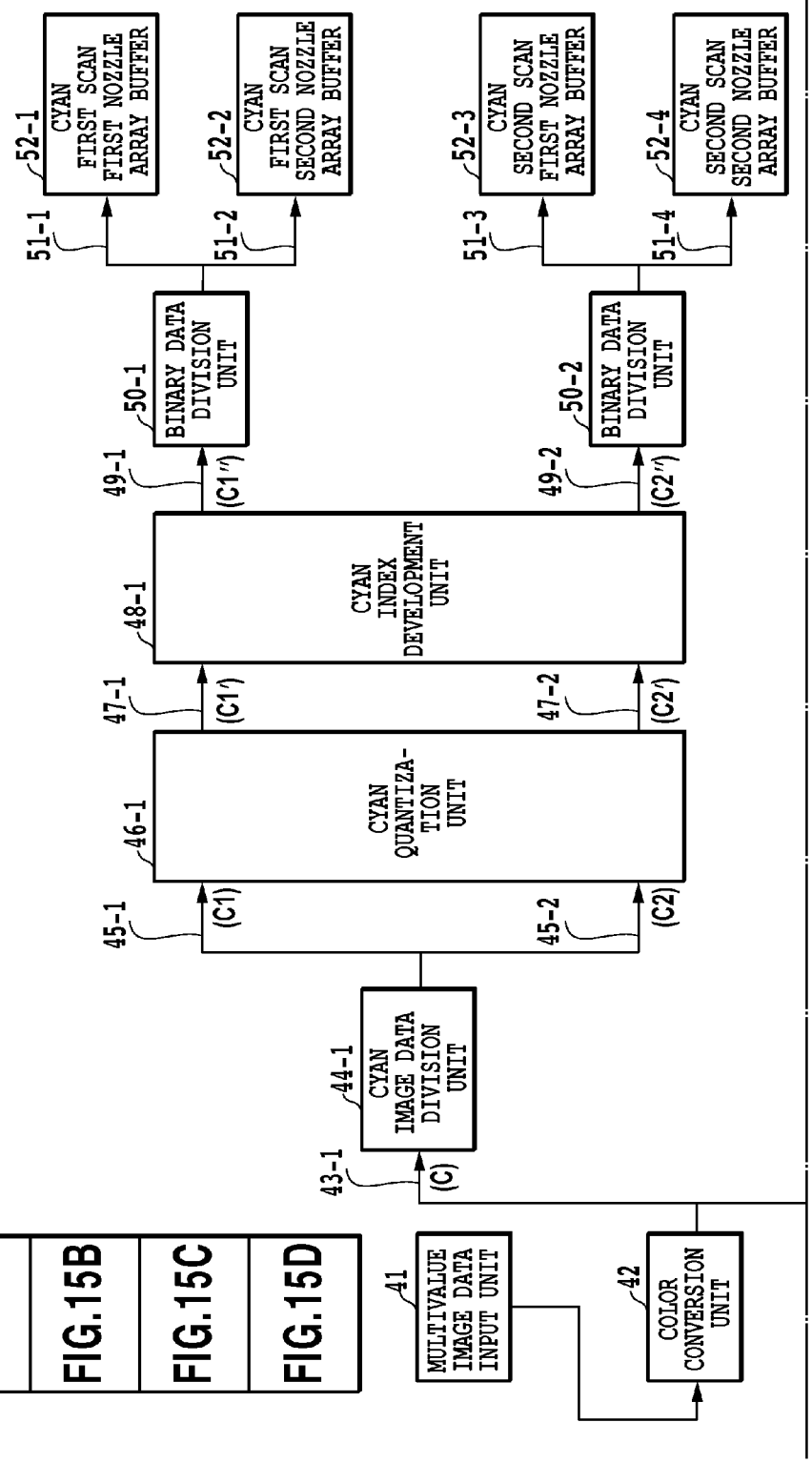

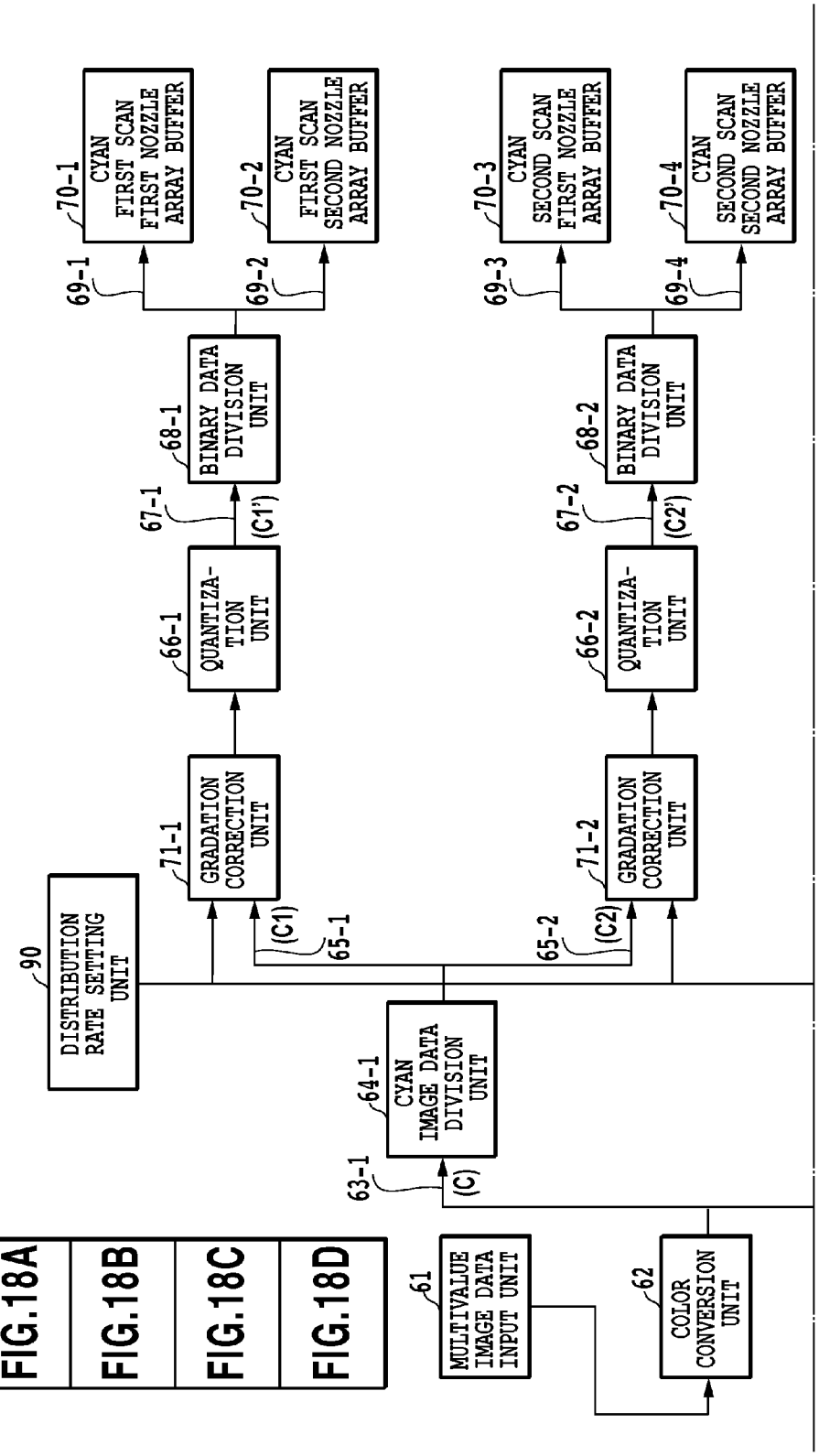

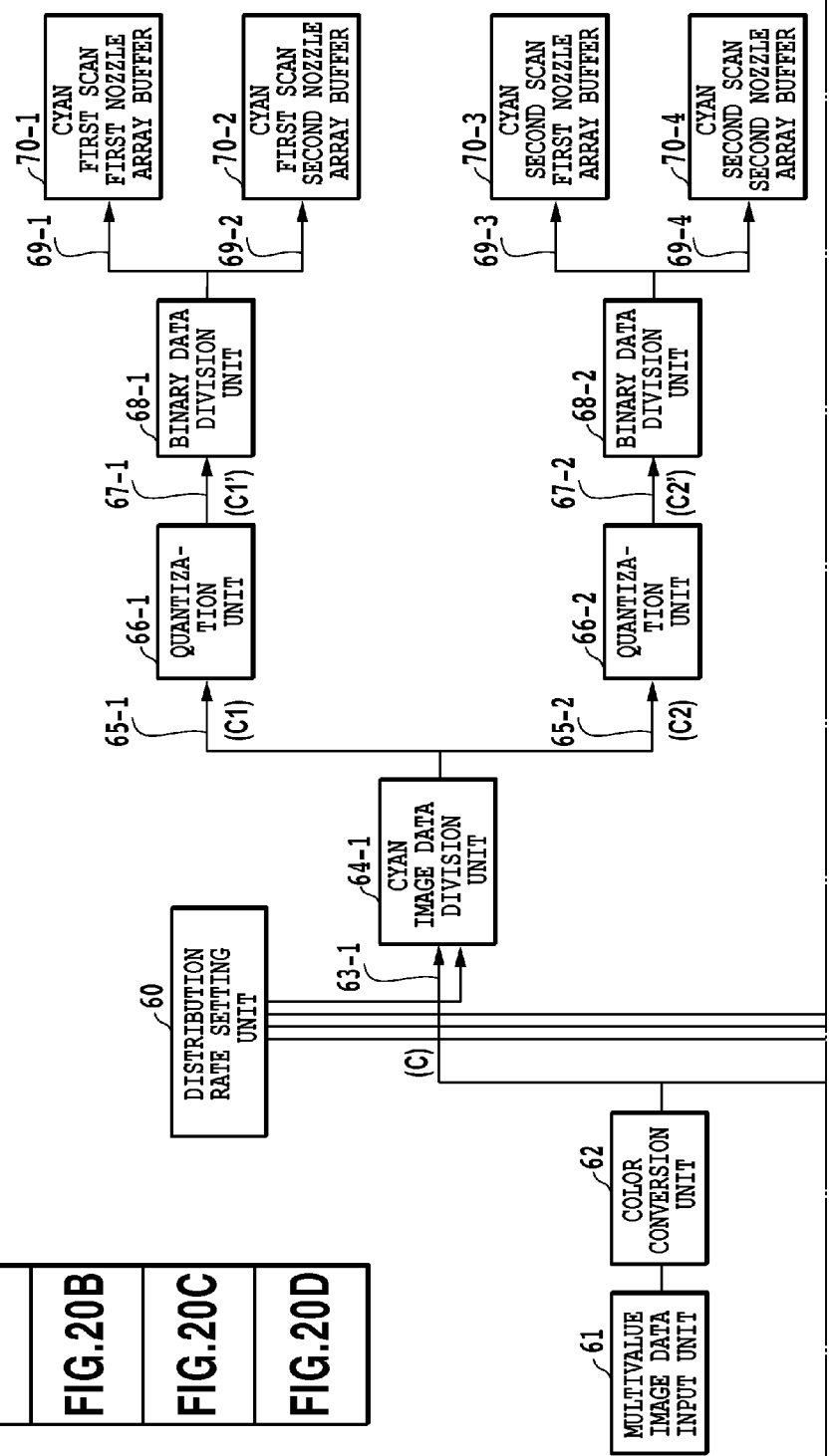

IMAGE PROCESSING APPARATUS AND IMAGE PROCESSING METHOD

BACKGROUND OF THE INVENTION

1. Field of the Invention

The present invention relates to an image processing apparatus and an image processing method which process multivalue image data associated with an area of interest on a print medium to print an image on the area by moving a printing unit relative to the area two or more times or moving a plurality of printing element groups relative to the same area.

2. Description of the Related Art

As a technology to alleviate density unevenness and stripes in an image printed by an inkjet printing apparatus, there has been known a multipass printing method which completes an image on an area of a print medium by performing a plurality of printing scans over that area. Even with the multipass printing method, however, there may occur a shift in a dot printed position between a preceding printing scan and a subsequent printing scan. Such a dot position shift or deviation can lead to variations in dot coverage rate, resulting in image impairments such as density variations and density unevenness.

To alleviate such image impairments, a method has been known which involves dividing image data in the form of multivalue image data before being binarized into different printing scans and then binarizing the divided multivalue image data independently of each other or in an uncorrelated manner (Japanese Patent Laid-Open Nos. 2000-103088 and 2001-150700). FIG. 9A shows an arrangement of dots printed according to image data processed by the method of Japanese Patent Laid-Open No. 2000-103088. In the figure, solid black circles 1501 represent dots printed in a first printing scan; blank circles 1502 represent dots printed in a second printing scan; and gray circles 1503 represent dots printed overlappingly by the first and the second printing scan.

With this arrangement, if a group of dots printed in the first printing scan and a group of dots printed in the second printing scan are shifted in the main scan direction or subscan direction, the dot coverage rate over the print medium does not change so much. The reason for this is that while areas newly emerge in which dots printed in the first scan and dots printed in the second scan overlap each other, there are also areas where two dots that are supposed to overlap each other do not overlap.

However, positively trying to make dots overlap by using the method of Japanese Patent Laid-Open Nos. 2000-103088 and 2001-150700 can deteriorate graininess and insufficient density. For example, in highlighted areas where graininess shows easily, it is preferred that a small number of dots (1701, 1702) be evenly scattered, a predetermined distance apart from each other, as shown in FIG. 9B. However, in the construction disclosed in the Japanese Patent Laid-Open No. 2000-103088, there occur in places areas in which dots are printed overlappingly (1603) or adjoiningly (1601, 1602), as shown in FIG. 9C. These dot lumps show and degrade the graininess. In high-density regions where importance is given to maximum density value, too many overlapping dots can expose blank areas, resulting in an insufficient density. So, the percentage of areas where dots overlap (dot overlap rate) is preferably adjusted not to cause undue density unevenness, graininess and insufficient density in output images.

Particularly when images are formed using a plurality of kinds of ink with different levels of brightness, the density unevenness, graininess and insufficient density vary from one ink to another. That is, to which of them—the restraining of density unevenness, the reduction in graininess and the avoidance of insufficient density—and to what extent the priority should be given changes depending on the kind of ink. So, when two or more colors of ink are used, it is desired that the dot overlap rate be properly adjusted according to the ink color.

In the method disclosed in Japanese Patent Laid-Open Nos. 2000-103088 and 2001-150700, although descriptions are made of the causes for density unevenness, no considerations are given to a level of density unevenness and a magnitude of increase in graininess resulting from the density unevenness reduction treatment. Therefore, the across-the-board execution of one density unevenness reduction treatment could result in an increased graininess which in turn causes a far worse image degradation than that which could have been caused by the inherent density unevenness. Further, the method disclosed in Japanese Patent Laid-Open Nos. 2000-103088 and 2001-150700 does not consider the fact that the level of density unevenness and the magnitude of an increase in graininess that results when the density unevenness reduction treatment is performed vary from one ink to another. For that reason, there has been a problem that density unevenness and graininess is hardly balanced.

SUMMARY OF THE INVENTION

The present invention has been accomplished to solve the aforementioned problem. It is therefore an object of this invention to provide an image processing apparatus and an image processing method capable of producing an image which, when formed by using a plurality of kinds of ink with different levels of brightness, has density unevenness, graininess and insufficient density so restrained that no noticeable image impairments occur.

In a first aspect of the present invention, there is provided an image processing apparatus to process input image data for pixel area to print on the associated pixel area of a print medium by a plurality of relative movements between a printing unit and the print medium, the printing unit being adapted to print dots by using a first ink and a second ink with different levels of brightness, the image processing apparatus comprising: a processing unit configured to process the input image data so that a percentage of the number of dots to be overlappingly printed at the same positions in the pixel area by the plurality of relative movements, with respect to a total number of dots to be printed in the pixel area by the plurality of relative movements, is differentiated between at the first ink and the second ink.

In a second aspect of the present invention, there is provided an image processing method to process input image data for pixel area to print on the associated pixel areas of a print medium by a plurality of relative movements between a printing unit and the print medium, the printing unit being adapted to print dots by using a first ink and a second ink with different levels of brightness, the image processing method comprising: a processing step to process the input image data so that a percentage of the number of dots to be overlappingly printed at the same positions in each of the pixel areas by the plurality of relative movements, with respect to a total number of dots to be printed the pixel areas by the plurality of relative movements, is differentiated between at the first ink and the second ink.

Further features of the present invention will become apparent from the following description of exemplary embodiments (with reference to the attached drawings).

BRIEF DESCRIPTION OF THE DRAWINGS

FIG. 3 is a diagram showing the relationship of FIGS. 3A to 3D;

FIG. 3A is a block diagram to explain image processing in a first embodiment;

FIGS. 4A-4H are diagrams to explain a dot overlap rate;

FIGS. 8A and 8B are diagrams showing examples of error diffusion matrix;

FIG. 12 is a diagram showing the relationship of FIGS. 12A to 12D;

FIG. 12A is a block diagram showing image processing performed in a fourth embodiment;

FIGS. 13A-13G are diagrams showing a relation between an input value and the result of quantization process;

FIG. 15 is a diagram showing the relationship of FIGS. 15A to 15D;

FIG. 15A is a block diagram showing image processing in a fifth embodiment;

FIG. 18 is a diagram showing the relationship of FIGS. 18A to 18D;

FIG. 18A is a block diagram showing image processing in a second embodiment;

FIG. 20 is a diagram showing the relationship of FIGS. 20A to 20D;

FIG. 20A is a block diagram showing image processing in a third embodiment;

DESCRIPTION OF THE EMBODIMENTS

While the following embodiments take up an inkjet printing apparatus as an example, this invention is not limited to the inkjet printing apparatus but is applicable to any other apparatus as long as they print an image on a print medium during a relative movement between a dot printing unit and a print medium relative to each other.

The "relative movement (or relative scan)" between the printing unit and the print medium means an operation of moving (or scanning) the printing unit relative to the print medium or an operation of moving (or conveying) the print medium relative to the printing unit. The printing unit refers to one or more printing element groups (nozzle arrays) or one or more print heads.

In the image processing apparatus described in the following, data processing is performed to produce an image in an area of interest (predetermined area) on a print medium by moving the printing unit relative to that area on the print medium a plurality of times or by moving a plurality of printing element groups relative to the area of interest. Here the "area of interest (predetermined area)" refers to "one pixel area" microscopically and, in a macroscopic term, "an area that can be printed by one relative movement". The word "pixel area (which may also be referred to simply as a "pixel")" means a minimum unit area capable of expressing a desired grayscale level indicated multivalue image data. Meanwhile, the "area that can be printed by one relative movement" refers to an area on a print medium that is scanned by the printing unit in one relative movement, or a smaller area (e.g., one raster area).

<Overview of Printing Apparatus>

Figure 1A:
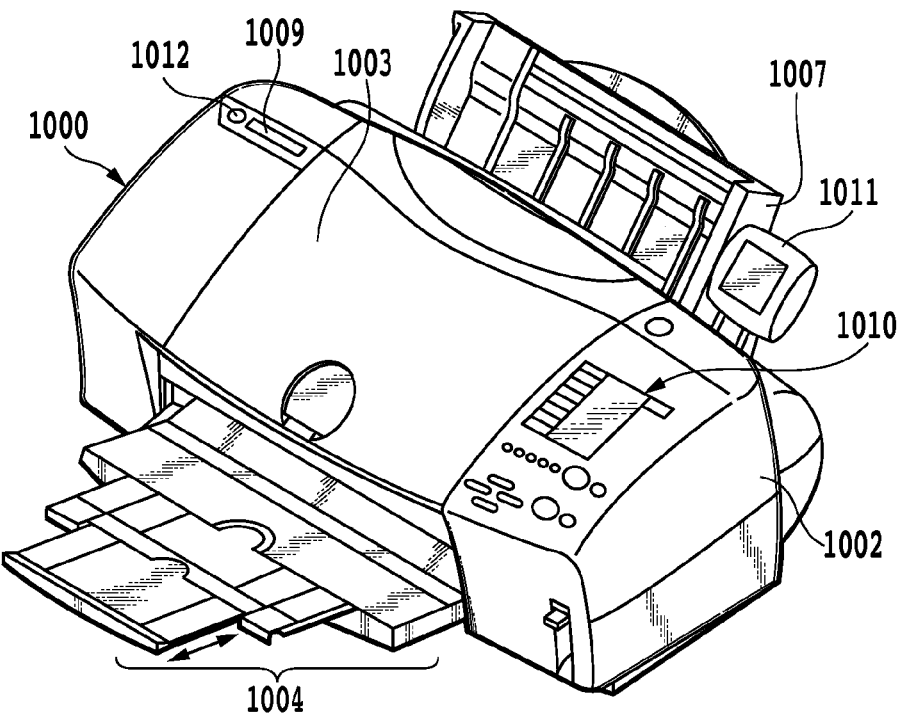
FIG. 1A is a schematic perspective view of a photo direct printer serving as an image processing apparatus of this invention.

FIG. 1A is a schematic perspective view of a photo direct printer (hereinafter referred to as a PD printer) 1000 that functions as an image processing apparatus of this invention. The PD printer 1000 has a function of receiving and printing data from a host computer, a function of directly reading and printing an image stored in a storage medium, such as a memory card, and a function of receiving and printing an image from a digital camera and a PDA or the like.

In the figure, reference number 1004 denotes a discharge tray on which printed sheets of paper can be received and stacked; and 1003 denotes an access cover that the user can open or close when he or she replaces a print head cartridge or an ink tank accommodated inside the printer body. On an operation panel 1010 provided on an upper case 1002, menu items for making various settings on printing conditions (e.g., the kind of print medium and the quality of printed image) are displayed. The user can make a desired setting according to the kind and use of an image that he is going to produce. Designated 1007 is an automatic feeder to automatically feed print medium sheets into the printer body. Denoted 1009 is a card slot into which a memory card-mounted adapter is inserted. Denoted 1012 is a USB terminal to which a digital camera is connected. At the back of the PD printer 1000 there is provided a USB connector for connection with a PC.

<Outline of Electrical Specifications of Control Unit>

Figure 2:
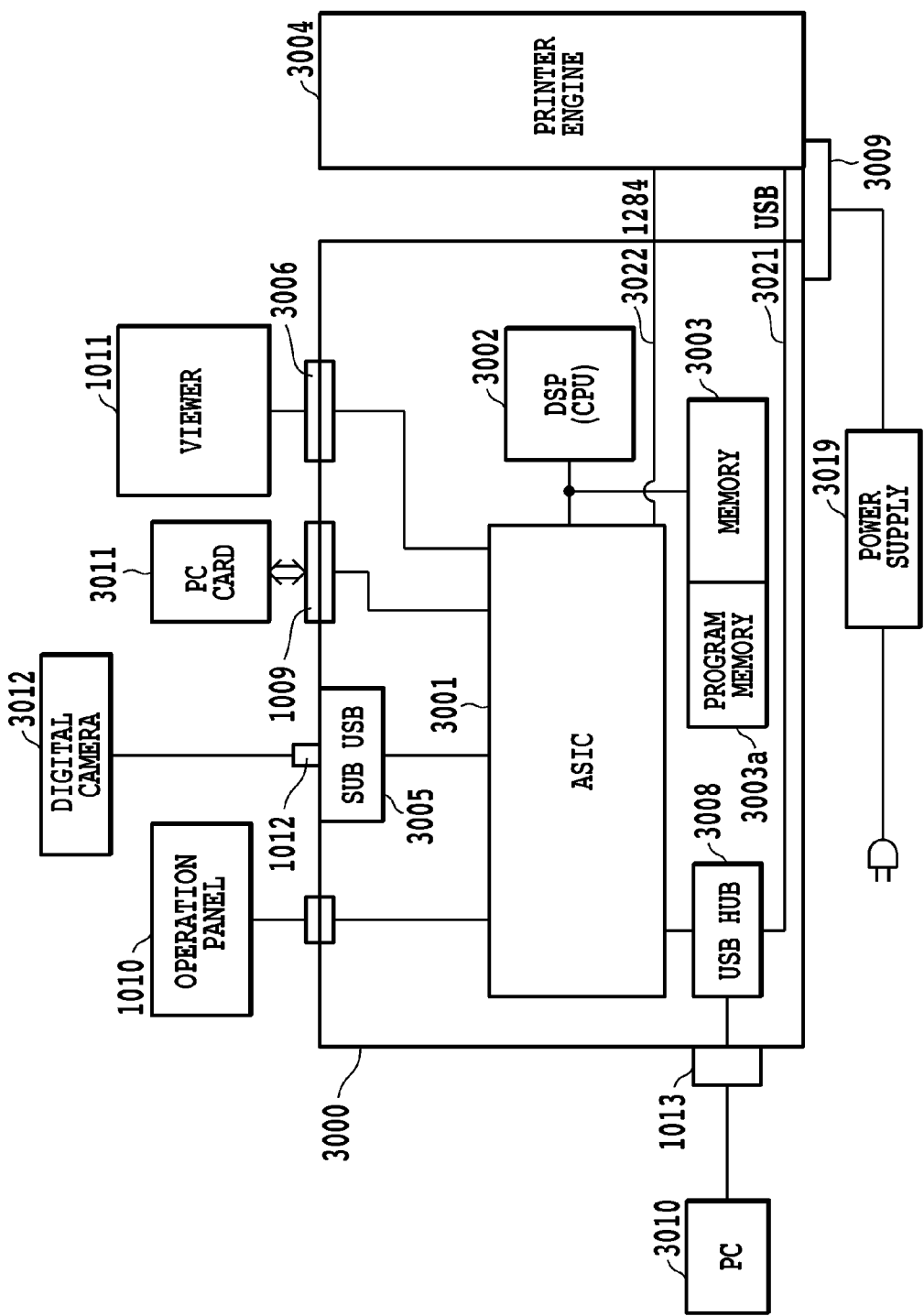
FIG. 2 is a block diagram showing a configuration of a control system in the PD printer according to one embodiment of this invention.
Figure 3B:
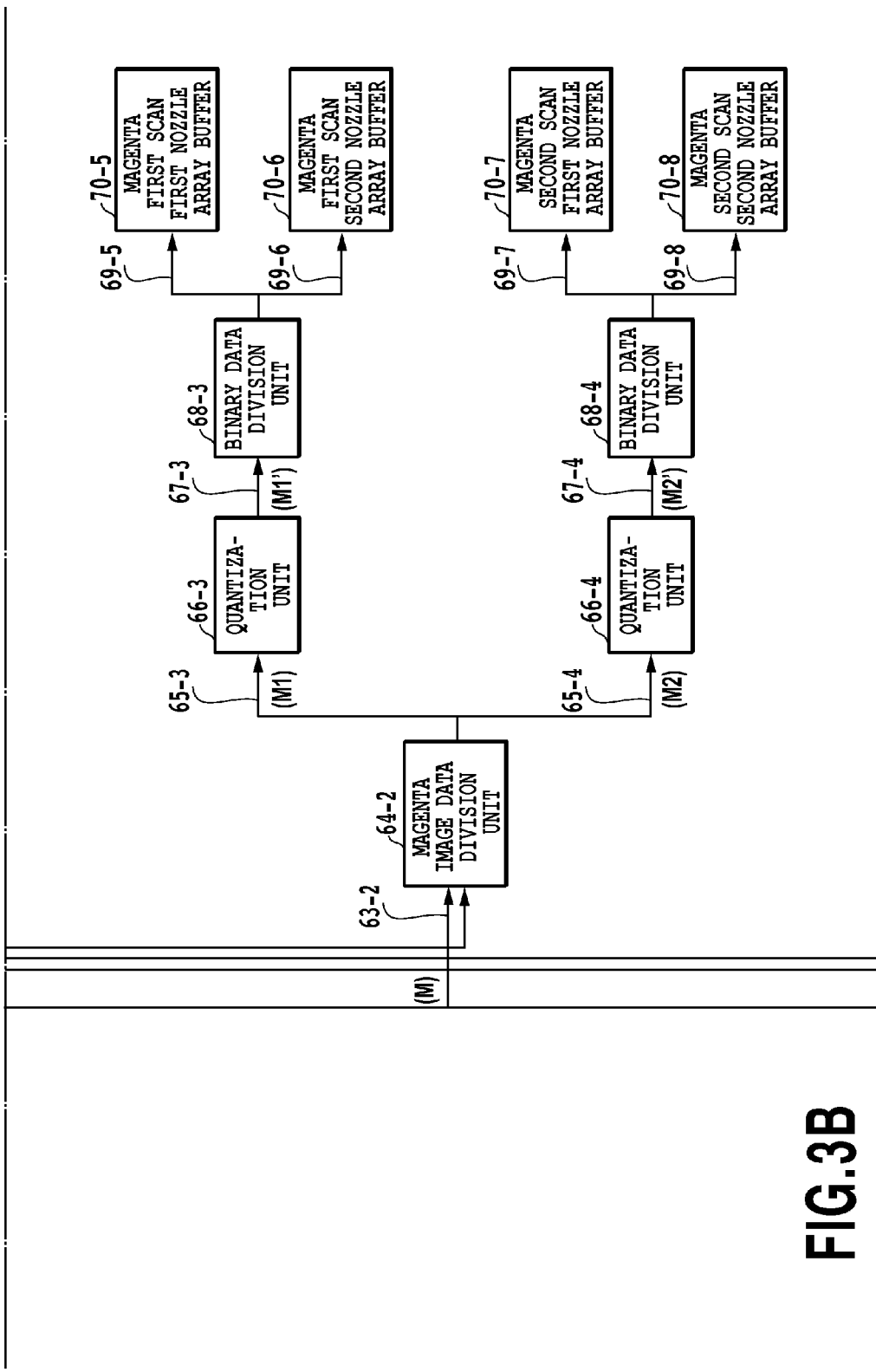
FIG. 3B is a block diagram to explain image processing in a first embodiment.
Figure 3C:
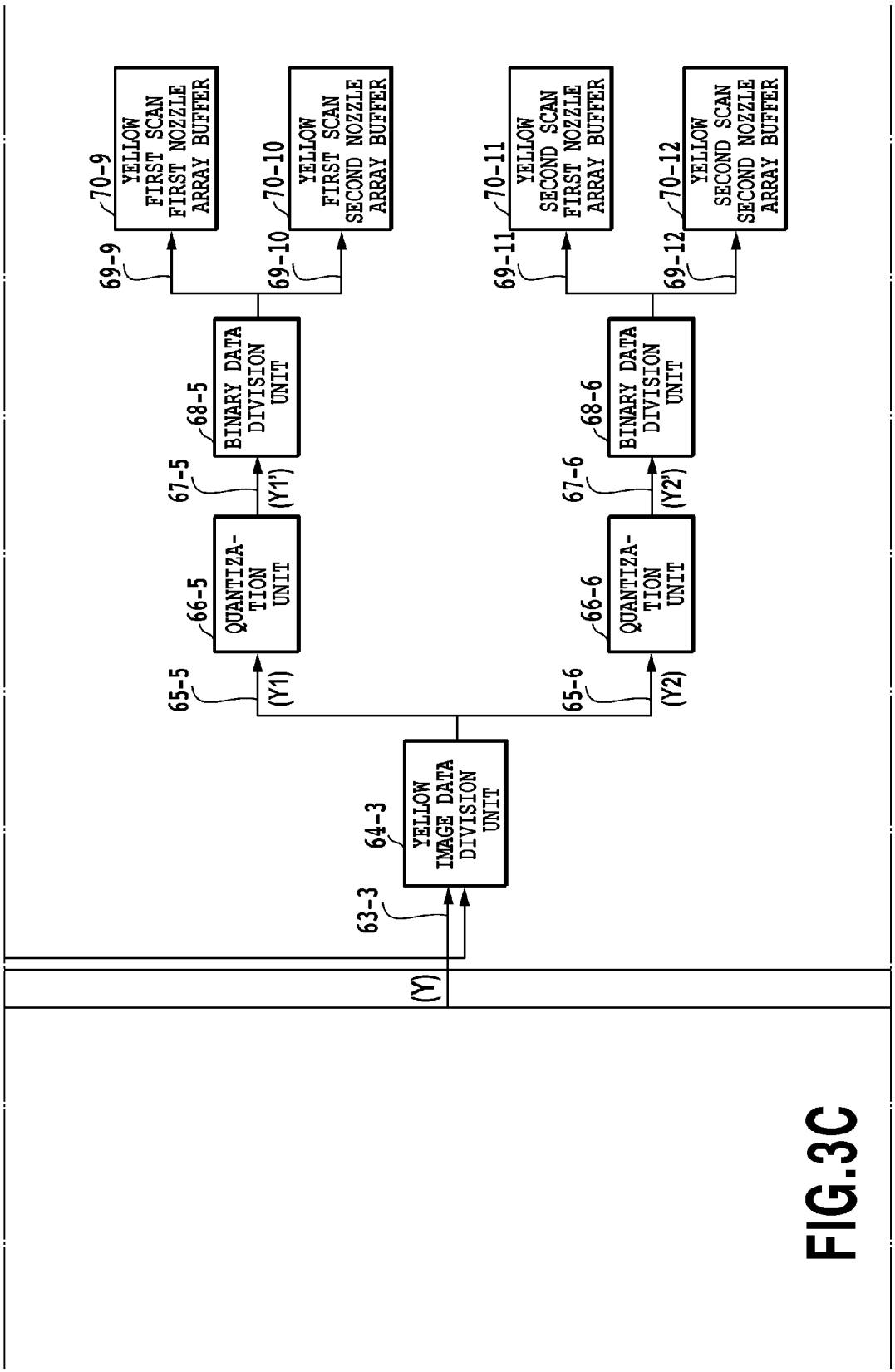
FIG. 3C is a block diagram to explain image processing in a first embodiment.
Figure 3D:
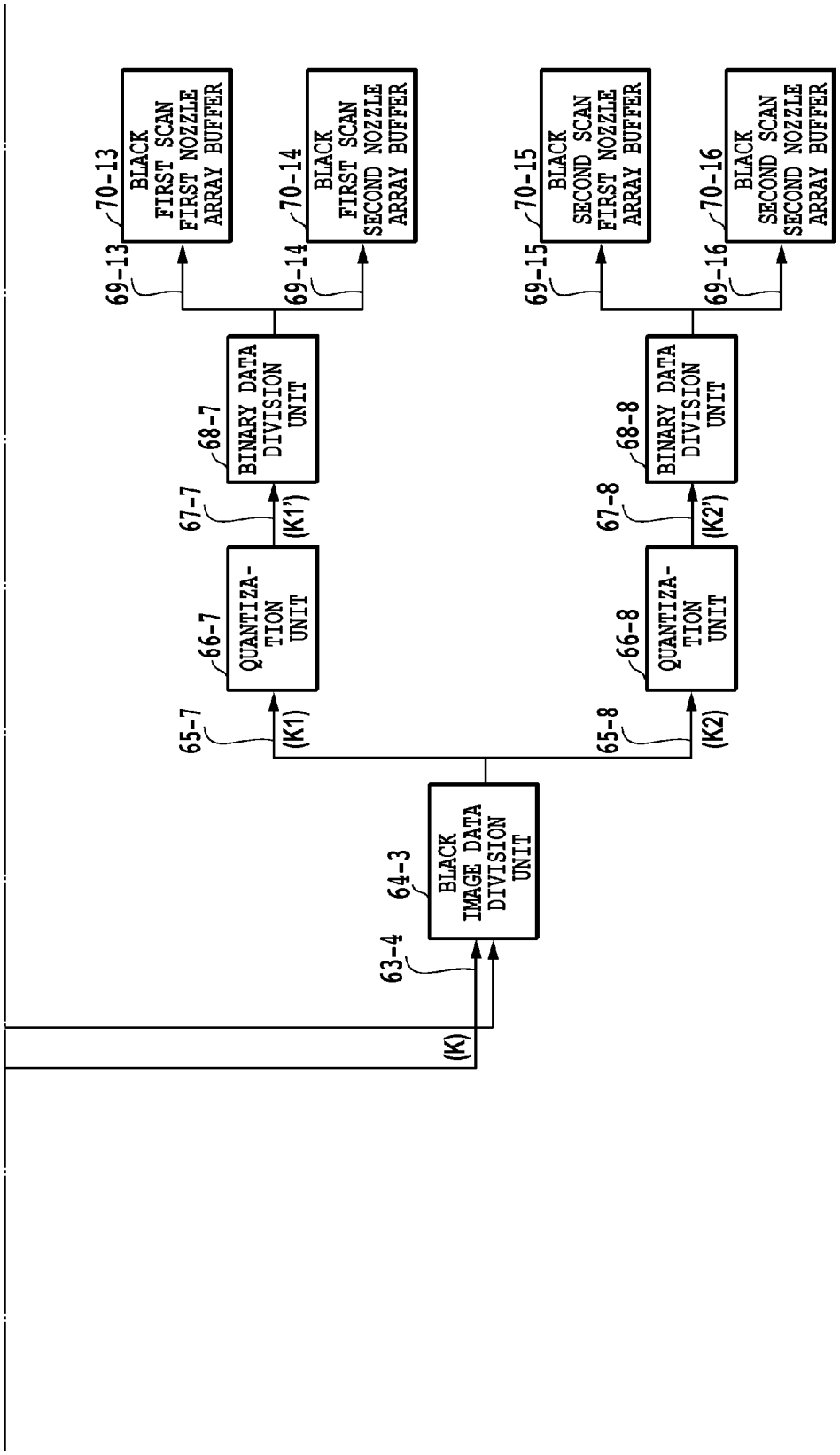
FIG. 3D is a block diagram to explain image processing in a first embodiment.

FIG. 2 is a block diagram showing the construction of essential parts of the PD printer 1000 in the embodiments of this invention that are involved in the control of the printer. In the figure, reference number 3000 represents a control unit (control circuit board) and 3001 an image processing ASIC (dedicated customized LSI). Denoted 3002 is a DSP (digital signal processor) with a CPU installed therein, which is assigned to perform a variety of control operations and image processing operations described later. A memory 3003 has a program memory 3003a to store a control program for the CPU of the DSP 3002, a RAM area to store a program being executed, and a memory area functioning as a work memory to store image data or the like. Denoted 3004 is a printer engine, in this case, for an inkjet printer to print color images using a plurality of color inks. Denoted 3005 is a USB connector as a port for connection with a digital camera (DSC) 3012. A connector 3006 is for a viewer 1011. Denoted 3008 is a USB hub which, when the PD printer 1000 prints based on the image data from the PC 3010, passes data from the PC 3010 as is, without being processed, to the printer engine 3004 through the USB 3021. This allows the connected PC 3010 to directly transfer data and signals to and from the printer engine 3004 for the printing operation (the printer in this case can function as a general PC printer). Designated 3009 is a power supply connector which receives from a power supply 3019 a DC voltage converted from a utility AC voltage. The PC 3010 is a general personal computer, 3011 a memory card (PC card) described earlier, and 3012 a digital camera (DSC). The signal transfer between the control unit 3000 and the printer engine 3004 is accomplished via the USB 3021 or an IEEE1284 bus 3022.

<Overview of Printing Unit>

Figure 1B:
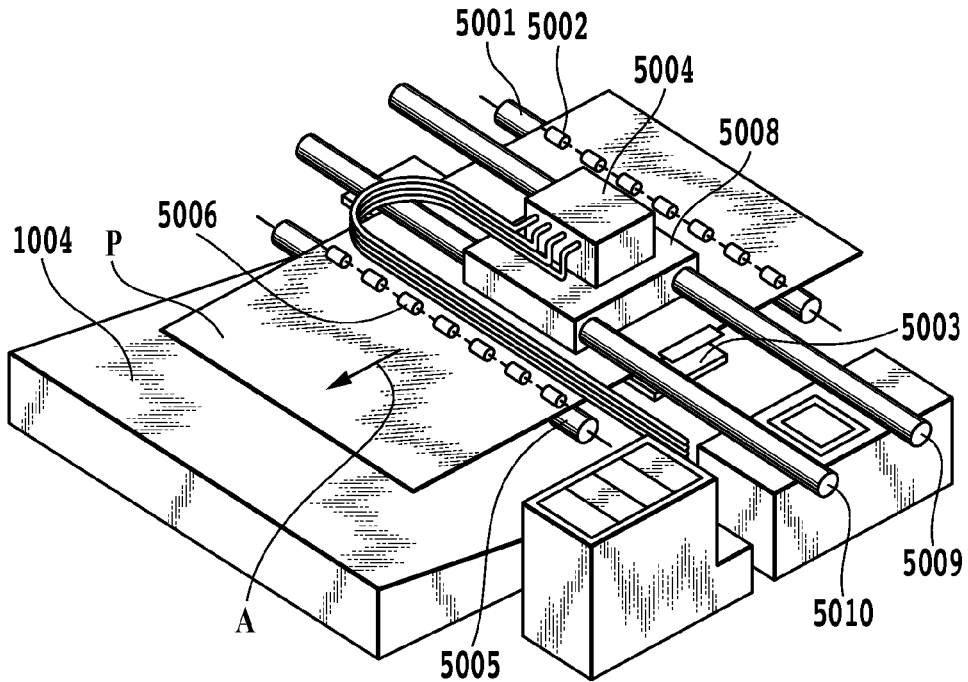
FIG. 1B is a schematic perspective view of a printing unit of a printer engine.

FIG. 1B is a perspective view showing an outline of the printing unit in the printer engine of a serial type inkjet printing apparatus according to the embodiments of this invention. A print medium P is fed by an automatic feeder 1007 to a nip portion between a conveying roller 5001 disposed on a conveying path and pinch rollers 5002 driven by the conveying roller. Then, the print medium P is conveyed by the rotation of the conveying roller 5001 in a direction of arrow A (subscan direction), guided and supported on a platen 5003. The pinch rollers 5002 are elastically urged toward the conveying roller 5001 by a pressing means not shown, such as springs. The conveying roller 5001 and the pinch rollers 5002 together constitute a first conveying means provided on an upstream side in the print medium conveyance direction.

The platen 5003 is provided at a printing position opposing a surface of an inkjet print head 5004 formed with ejection openings (ejection face) and supports the back of the print medium P to keep the distance between the surface of the print medium P and the ejection face constant. The print medium P, after being carried to the platen 5003 and printed, is held between a driving discharge roller 5005 and spurs 5006 rotated by the discharge roller and is conveyed in the direction A onto a discharge tray 1004. The discharge roller 5005 and the spurs 5006 constitute a second conveying means provided on a downstream side in the print medium conveyance direction.

The print head 5004 is removably mounted on a carriage 5008, with its ejection face opposing the platen 5003 or print medium P. The carriage 5008 is reciprocated along two guide rails 5009, 5010 by a carriage motor E0001. During this reciprocal motion, the print head 5004 executes an ink ejection operation according to a print signal. The direction in which the carriage 5008 travels is called a main scan direction and crosses the arrow A direction in which the print medium is conveyed, which is called a subscan direction. By alternating the main scan operation of the carriage 5008 and the print head 5004 (accompanied by a printing operation) and the subscan conveyance operation of the print medium, the print medium P is printed.

Figure 11A:
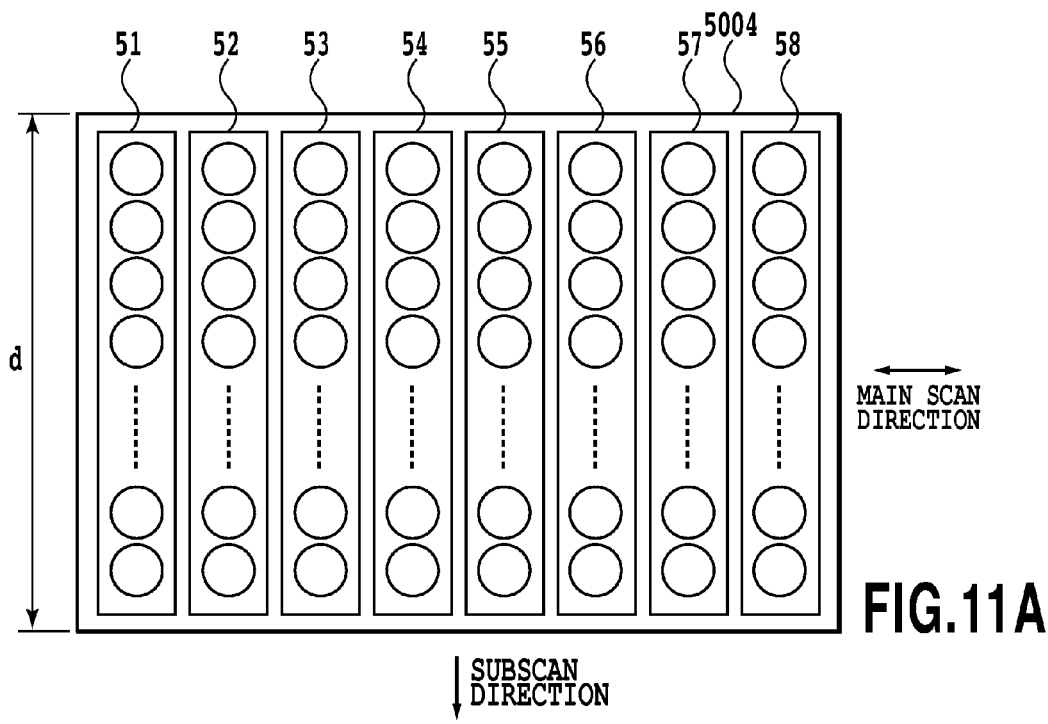
FIGS. 11A-11C show nozzle opening arrays in a print head.

FIG. 11A is a schematic view of the print head 5004 as seen from the ejection opening-formed surface. In the figure, reference numbers 51 and 58 represent a first and a second cyan nozzle array (first and second printing element group), and 52 and 57 represent a first and a second magenta nozzle array. 53 and 56 represent a first and a second yellow nozzle array, and 54 and 55 a first and a second black nozzle array. Each of the nozzle arrays has a width d in the sub-scan direction and thus, in one printing scan, is able to print a strip of width d.

The printing apparatus of this embodiment performs a multipass printing, so an area of the print medium can be printed by a single main scan is progressively formed with an image by the print head 5004 executing a plurality of printing scans. At this time, a conveying operation of the print medium a distance smaller than the width d of the print head 5004 may be executed between the successive printing scans in order to further reduce undesired density unevenness and stripes caused by characteristic variations of individual nozzles.

<Relation Between Dot Overlap Rate Control and, Density Unevenness and Graininess>

Figure 9A:
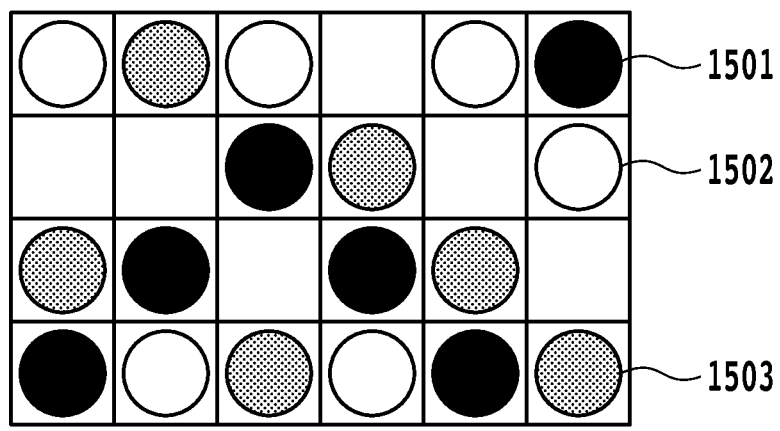
FIGS. 9A-9C show scattered states of dots.
Figure 9B:
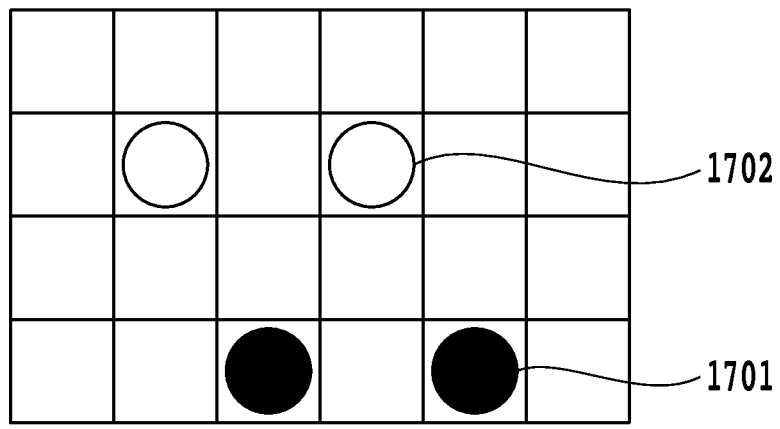
Figure 9C:
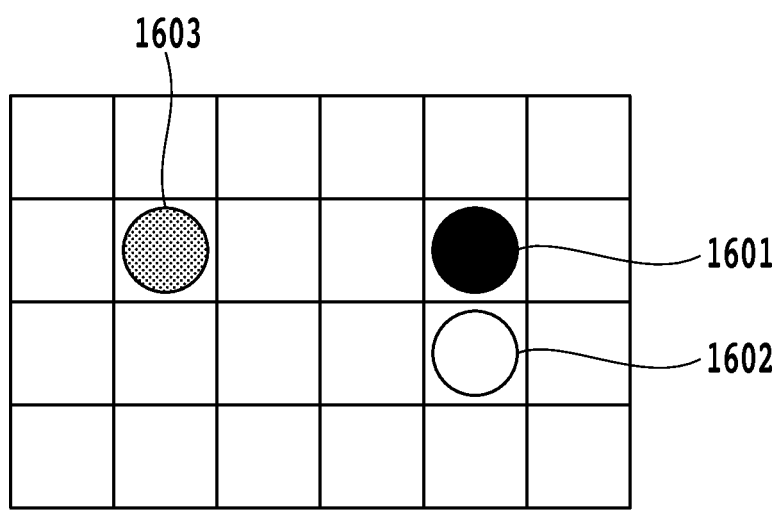

As described in the Related Art, when dots formed by different scans or different printing element groups shift and overlap, the density of the printed image varies from one location to another. This is perceived as density unevenness. To deal with this problem, this invention prepares beforehand a certain number of dots that are to be printed overlappingly at the same positions (same pixels or same subpixels) and makes an arrangement which, when printing position shifts occur, increases blank areas by making originally adjoining dots overlap each other and at the same time reduces blank areas by making originally overlapping dots separate from each other. This offsets an increase and a decrease in blank area, i.e., offsets a density increase with a density decrease, both caused by the print position shifts, which in turn is expected to minimize density variations in the entire image. It is noted, however, that preparing the overlapping dots in advance can degrade graininess or bring about insufficient density, as explained with reference to FIG. 9C. That is, in the process of adjusting the number of overlapping dots that are prepared beforehand, it can be said that the density unevenness and the graininess or insufficient density have a tradeoff relationship.

However, as to the density variations and also the graininess and insufficient density, there is some allowable range (in which these anomalies are hardly recognizable because of the characteristic of human vision). It is therefore expected that if the dot overlap rate is adjusted to an extent that brings both of the anomalies within the allowable range, image impairments in the formed image can be made hardly noticeable. The allowable range, however, changes depending on a variety of conditions, such as the kind of ink used, the kind of print medium and density data value, and an appropriate dot overlap rate does not necessarily remain the same at all times. Particularly when a plurality of colors of ink are used in printing a color image, the appropriate dot overlap rate changes according to ink color, especially, ink brightness. It is therefore desired that a provision be made to be able to control the dot overlap rate according to ink color.

The "dot overlap rate" is explained here. The "dot overlap rate", as shown in FIGS. 4A-4G and FIG. 16, is a percentage of those dots that are to be overlappingly printed in the same pixels in different scans or by different printing element groups (overlapping dots) with respect to a total number of dots that are printed in a unit area composed of T pixels (T is an integer equal to or greater than 1). The "same pixels" refer to the same pixel positions in the case of FIGS. 4A-4G and the same subpixel positions in the case of FIG. 16.

An explanation will be given about the dot overlap rate involving a first plane and a second plane, each corresponding to a unit area defined by 4 pixels (in main scan direction) by 3 pixels (in subscan direction), with reference to FIGS. 4A-4G. The "first plane" represents a set of binary data corresponding to a first scan or a first nozzle group; and the "second plane" represents a set of binary data corresponding to a second scan or a second nozzle group. "1" represents data instructing to print a dot and "0" represents data instructing not to print a dot.

In FIGS. 4A-4E the number of "1s" in the first plane is "4" and that in the second plane is also "4", so the total number of dots to be printed in a unit area composed of 4 pixels×3 pixels is "8". The number of "1s" in the first and the second plane at the same pixel positions represents the number of dots to be printed overlappingly in these same pixels (the number of overlapping dots). FIG. 4A has the number of overlapping dots of "0", FIG. 4B "2", FIG. 4C "4", FIG. 4D "6" and FIG. 4E "8". Therefore, the dot overlap rates in FIGS. 4A-4E are 0%, 25%, 50%, 75% and 100% as shown in FIG. 4H. Further, FIG. 4F represents a case of the dot overlap rate of 86% with the number of dots printed in the first plane being "4", that of the second plane being "3", the total dot number being "7" and the number of overlapping dots being "6". FIG. 4G represents a case of the dot overlap rate of 33% with the number of dots printed in the first plane being "4", that of the second plane being "2", the total dot number being "6" and the number of overlapping dots being "2". As shown above, the "dot overlap rate" is a percentage of overlapping dot data obtained by virtually stacking the two sets of dot data one upon the other, which are to be printed by different scans or different printing element groups.

Next, our explanation focuses on a relationship between graininess and density unevenness for cyan (C), magenta (M), yellow (Y) and black (K) inks used in this embodiment. Generally, among the four colors of cyan (C), magenta (M), yellow (Y) and black (K), they have a brightness relationship of K<M<C<Y.

Figure 17:
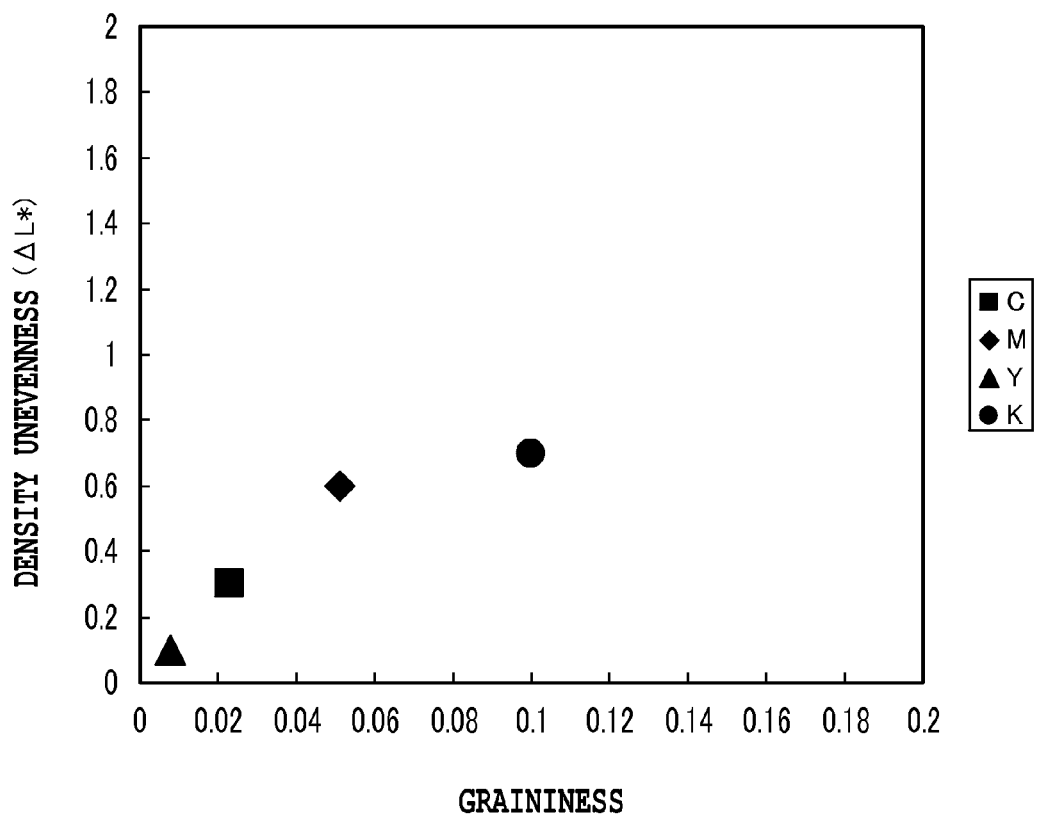
FIG. 17 is a graph showing a relation between graininess and density unevenness when a print position deviation occurs.
Figure 18B:
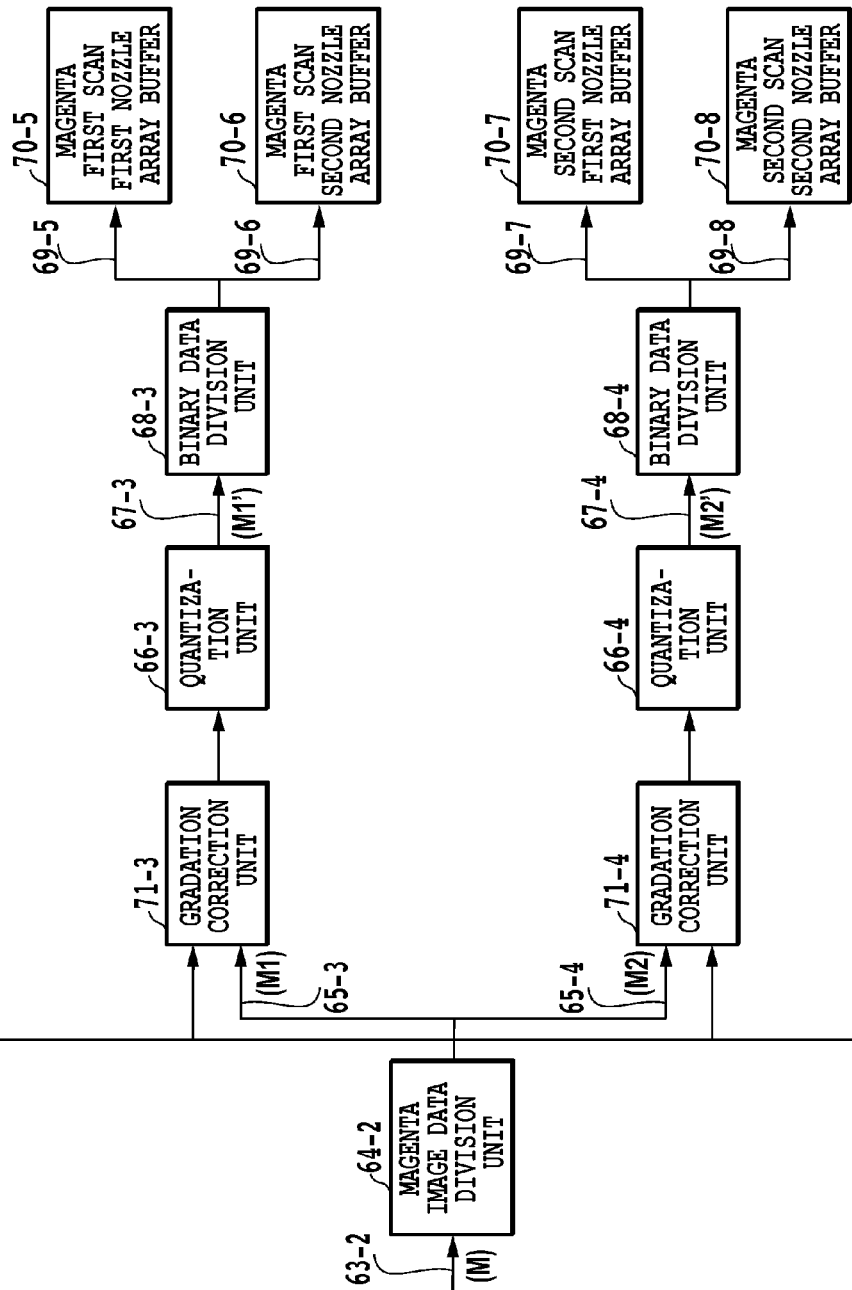
FIG. 18B is a block diagram showing image processing in a second embodiment.
Figure 18C:
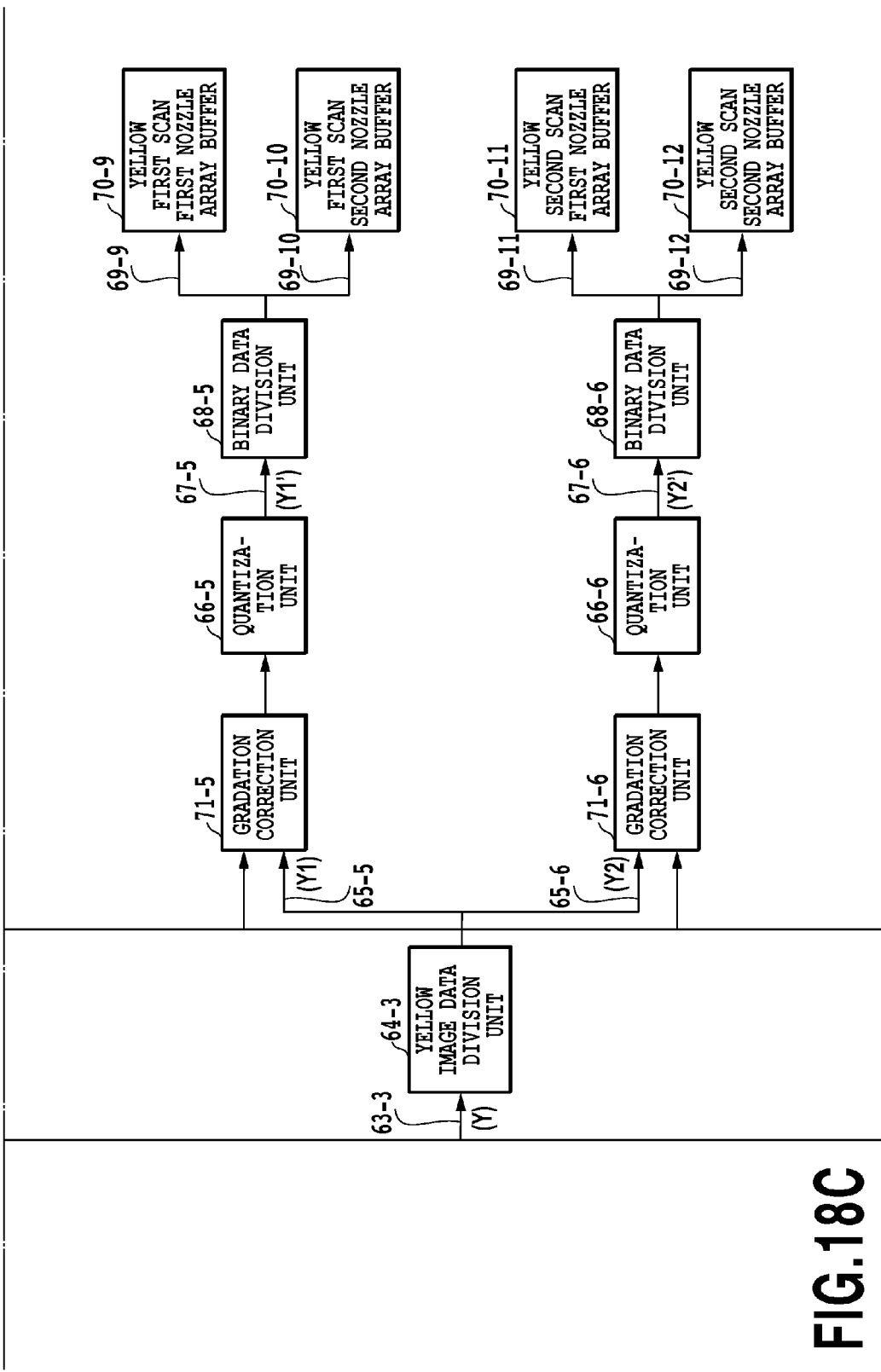
FIG. 18C is a block diagram showing image processing in a second embodiment.
Figure 18D:
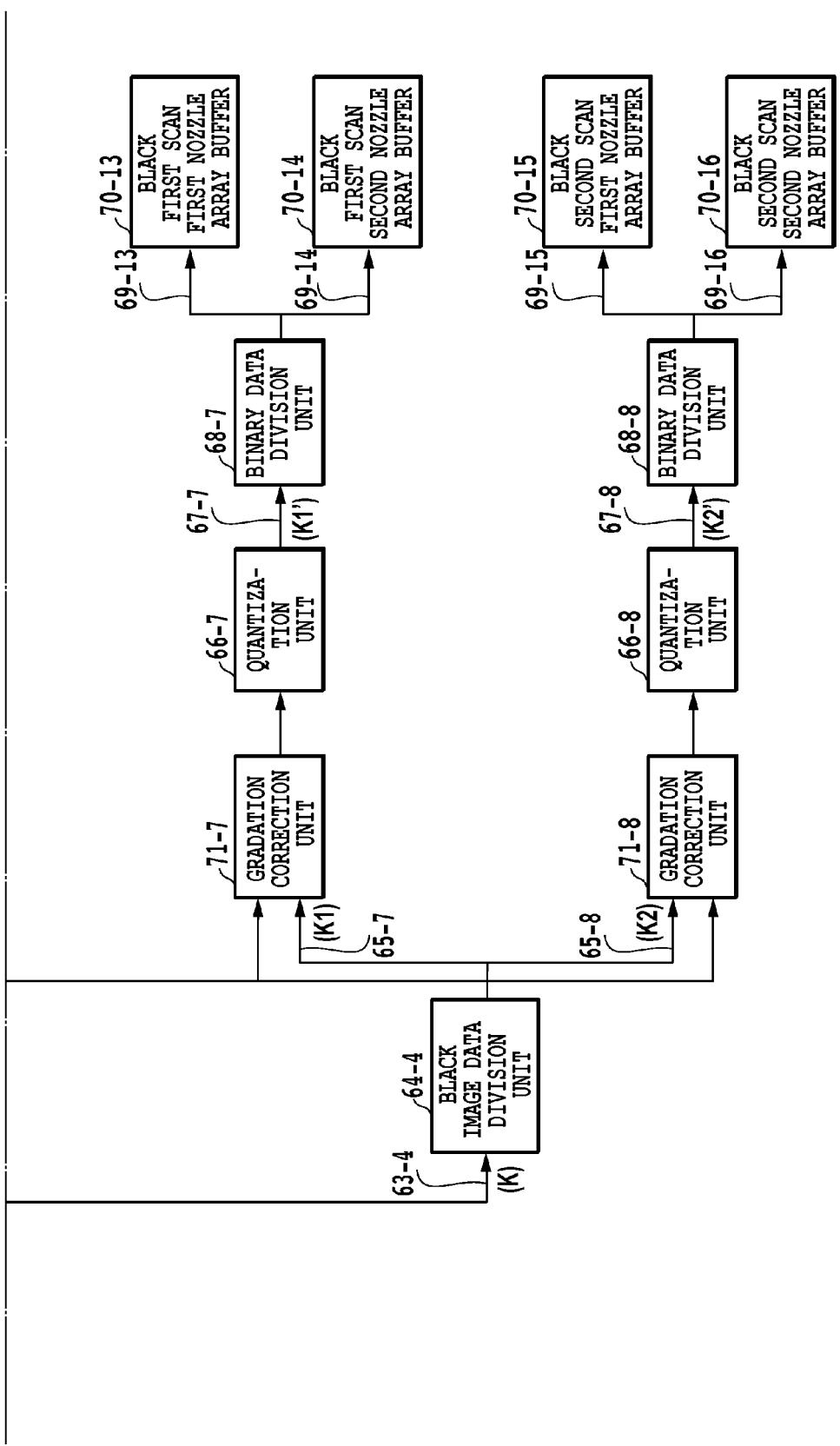
FIG. 18D is a block diagram showing image processing in a second embodiment.

FIG. 17 shows a relation between graininess and density unevenness for individual ink colors when a single-color image with a printing rate of 150% is printed with a dot overlap rate of 20% and a one-pixel print position shift occurs. An abscissa represents a degree of granularity and an ordinate represents a brightness difference ΔL between an image with no one-pixel print position shift and an image with one-pixel print position shift.

The figure shows that, in terms of density unevenness, there is a relationship of K>M>C>Y, i.e., the higher the brightness level of an ink, the less the density unevenness is noticeable. Especially with yellow, there is observed almost no density unevenness and it can safely be said that yellow does not easily produce density variations due to printing position shifts and therefore the insufficient density issue also hardly becomes perceivable. Further, since it has a sufficiently lower level of granularity, the yellow ink can be considered not to require a special provision for controlling the dot overlap rate and to employ a conventional common printing procedure.

For other inks that tend to be more noticeable in terms of density unevenness than the yellow ink, the level of density unevenness varies from one color to another and the dot overlap rate required to keep the density unevenness level in the allowable range also varies among different ink colors. That is, different ink colors have different dot overlap rates to keep the density unevenness within the allowable range without causing unnecessarily large increases in graininess and density insufficiency.

As described above, when a plurality of inks with different brightness levels are used, it is desired that, for an optimal balance among the density unevenness, graininess and density insufficiency for each color, a decision be made for each ink color about whether or not the dot overlap rate needs adjustment and, if so, at what level it should be adjusted.

In the following, the image processing method to control the dot overlap rate in this invention will be explained by taking up some example cases.

First Embodiment

FIGS. 3A to 3D are block diagrams showing the image processing when a 2-pass printing is performed to complete an image in an area of interest on a print medium by two printing scans. In this embodiment, a multivalue image data input unit 61, a color conversion unit 62, a distribution rate setting unit 60, image data division units 64-1 to 64-4 and quantization units 66-1 to 66-8 are all provided in the control unit 3000.

The multivalue image data input unit 61 receives multivalue (256-value) RGB image data from an external device. The input image data (multivalue RGB data) is converted for each pixel by the color conversion unit 62 into four sets of multivalue image data (color-specific multivalue data), one for each of the four ink colors (CMYK). The color conversion unit 62 has a three-dimensional lookup table (LOT) that provides a one-to-one match between RGB values and CMYK values. By using this LOT, the RGB data can be converted en masse into the color-specific multivalue data (C, M, Y, K). For those input values deviating from lattice points on the table, an output value may be calculated by interpolating output values of neighboring lattice points.

The process described below is executed parallelly and independently for the four CMYK colors. The color-specific multivalue data (C, M, Y, K) 63-1 to 63-4 are sent to the corresponding image data division units 64-1 to 64-4. In the image data division units 64-1 to 64-4, the multivalue data 63-1 to 63-4 are divided (converted) into first scan multivalue data (C1, M1, Y1, K1) and second scan multivalue data (C2, M2, Y2, K2) according to the distribution rate for each ink color that the distribution rate setting unit 60 determines. In this embodiment, different distribution rates are used for different ink colors during the process of division performed by the image data division units 64-1 to 64-4 to differentiate the dot overlap rate among the four colors. The method of conversion used to differentiate the dot overlap rate among different colors will be described later in detail.

Eight sets of multivalue data 65-1 to 65-8 generated by the image data division units 64-1 to 64-4 of four colors are binarized (quantized) by the individual quantization units 66-1 to 66-8.

A process for the black ink is explained as an example. The quantization unit 66-7 performs the binarization (quantization) on the black first scan multivalue data 65-7 (K1) to produce black first scan binary data 67-7 (K1'). The quantization unit 66-8 performs the binarization (quantization) on the black second scan multivalue data 65-8 (K2) to produce black second scan binary data 67-8 (K2'). In this embodiment, the quantization method employed by these eight quantization units 66-1 to 66-8 is a generally used error diffusion method.

In the quantization process for the same ink, it is preferred that different diffusion matrices be used in order to properly mix pixels in which dots are printed by two scans and pixels in which dot is printed by only one of the two scans. For example, the quantization units 66-1, 66-3, 66-5, 66-7 may use a diffusion matrix shown in FIG. 8A and the quantization units 66-2, 66-4, 66-6, 66-8 may use a diffusion matrix shown in FIG. 8B.

As a result of the quantization operation described above, pixels that have 1 for both K1' and K2' are printed with black dots overlappingly and pixels that have 0 for both K1' and K2' are printed with no black dots. Pixels having 1 for only one of K1' and K2' are printed with only one black dot. The same also applies to dots of other ink colors.

When binary image data C1', C2', M1', M2', Y1', Y2', K1', K2' are generated by the quantization units 66-1 to 66-8, these data are sent to the printer engine 3004 of FIG. 2 through an IEEE 1284 bus 3022.

In the printer engine 3004, the binary data K1' (67-7) is transferred to the black first scan binary data division unit 68-7. The black first scan binary data division unit 68-7 performs a division operation on the binary data K1' for two nozzle arrays 54, 55 capable of ejecting black ink by using a mask already stored in memory. The binary data K2' (67-8) is transferred to the black second scan binary data division unit 68-8. The black second scan binary data division unit 68-8 performs a division operation on the binary data K2' for two nozzles 54, 55 capable of ejecting black ink by using a mask stored in memory.

Figure 5:
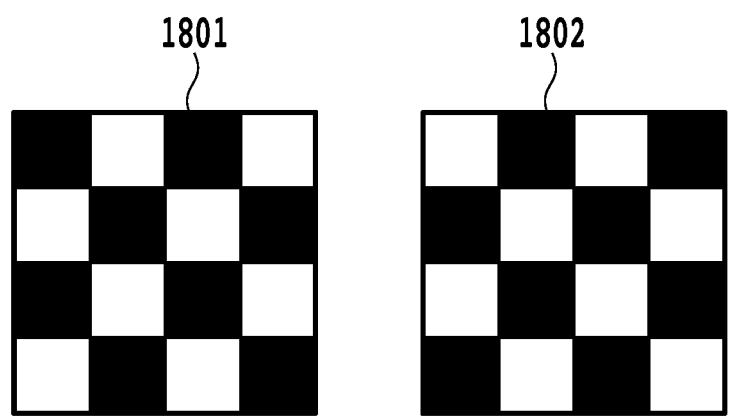
FIG. 5 is a diagram showing an example of mask applicable to this invention.

Here, the mask is a set of predetermined data (1s and 0s), the mask data 1 permitting the binary image data to be printed in a pixel, the mask data 0 not permitting the binary image data to be printed in the pixel. By taking a logical AND of the binary image data and the predetermined mask data for each pixel, the binary image data can be divided. In dividing binary image data into N parts, it is common to use N masks. In this embodiment where binary image data is divided into two parts for two scans, two masks 1801, 1802 as shown in FIG. 5 are used. Black portions represent mask data 1 permitting image data to be printed (mask data that does not mask the image data) and blank portions represent mask data 0 not permitting image data to be printed (mask data that masks the image data). The mask 1801 is used to generate binary data for the nozzle array 54 and the mask 1802 is used to generate binary data for the nozzle array 55. The two masks are complementary, so the binary data divided by these masks do not overlap each other. That is, those black first scan binary data indicated to be printed (1) are printed on a print medium by the two nozzle arrays 54, 55 without overlapping each other. This dividing operation is similarly performed on the black second scan binary data and other ink colors.

After the dividing operation, black first scan first nozzle array binary data (69-13) is stored in a black first scan first nozzle array buffer 70-13 and then printed in the first scan by the nozzle array 54. Black first scan second nozzle array binary data (69-14) is stored in a black first scan second nozzle array buffer 70-14 and printed in the first scan by the nozzle array 55. Further, black second scan first nozzle array binary data (69-15) is stored in a black second scan first nozzle array buffer 70-15 and printed in the second scan by the nozzle array 54. Black second scan second nozzle array binary data (69-16) is stored in a black second scan second nozzle array buffer 70-16 and printed in the second scan by the nozzle array 55. This operation also applies to other ink colors.

A method of controlling the dot overlap rate characteristic of this embodiment will be explained as follows. Table 1 shows distribution rates at which the multivalue data is divided between the first and the second scan by the image data division units 64-1 to 64-4 of this embodiment, and dot overlap rates between the first and the second scan when the general error diffusion operation is performed on the first and second scan multivalue data.

In Table 1, the printing rate (%) refers to the number of ink dots of one color printed in the unit area. When no dot is printed in the unit area, the printing rate is 0%; and when the maximum number of dots is printed in the unit area, the printing rate is 100%. So, a printing rate of 60%, for example, means that the number of dots (153) equivalent to 60% of the maximum value (255) of the multivalue data 63-1 to 63-4 of each color is printed in the unit area. Table 1 shows such a dot overlap rate of 0-100% in ten stages.

The distribution rate (%) refers to a percentage at which the multivalue data determined by the printing rate is distributed to a first scan and a second scan. The total of the distribution rates is 100%. When cyan multivalue data (C=100) is distributed to first scan multivalue data (C1=80) and second scan multivalue data (C2=20), for example, the distribution rate is C1:C2=80:20. Table 1 shows such a distribution rate in six stages. The table also shows dot overlap rates as related to the distribution rate and the printing rate, obtained after being subjected to the binarization by the general error diffusion method.

TABLE 1

| Distribution rate (%) | | Printing rate (%) | | | | | | | | | |
|---|---|---|---|---|---|---|---|---|---|---|---|
| First scan | Second scan | 10 | 20 | 30 | 40 | 50 | 60 | 70 | 80 | 90 | 100 |
| 100 | 0 | 0 | 0 | 0 | 0 | 0 | 0 | 0 | 0 | 0 | 0 |
| 90 | 10 | 1.8 | 3.6 | 5.4 | 7.2 | 9 | 10.8 | 12.6 | 14.4 | 16.2 | 18 |
| 80 | 20 | 3.2 | 6.4 | 9.6 | 12.8 | 16 | 19.2 | 2.4 | 25.6 | 28.8 | 32 |
| 70 | 30 | 4.2 | 8.4 | 12.6 | 16.8 | 21 | 25.2 | 29.4 | 33.6 | 37.8 | 42 |
| 60 | 40 | 4.8 | 9.6 | 14.4 | 19.2 | 24 | 28.8 | 33.6 | 38.4 | 43.2 | 48 |
| 50 | 50 | 5 | 10 | 15 | 20 | 25 | 30 | 35 | 40 | 45 | 50 |

Figure 6:
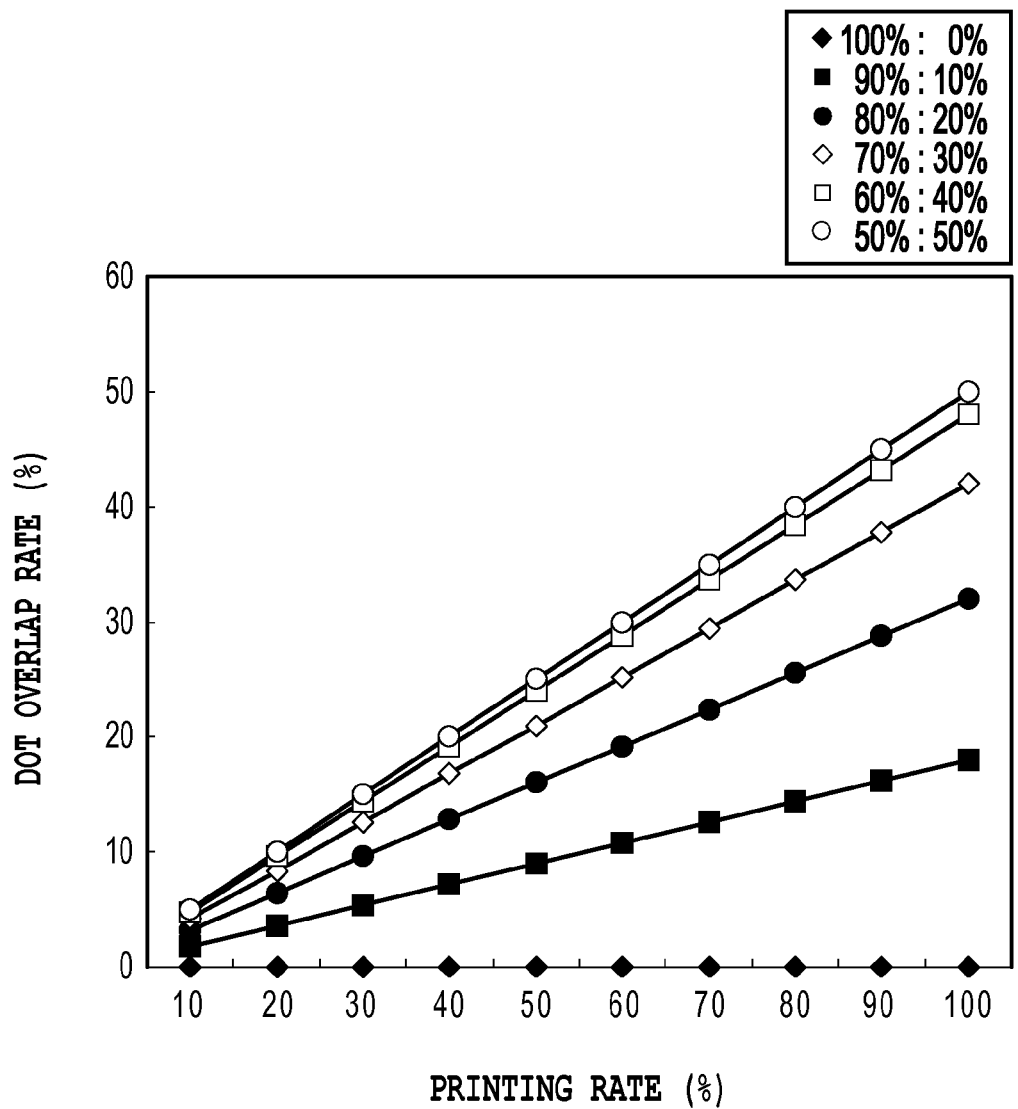
FIG. 6 is a diagram showing a relation between a distribution rate and a dot overlap rate in the embodiment of this invention.

FIG. 6 is a graph plotting the values of Table 1, with the abscissa representing a printing rate and the ordinate representing a dot overlap rate. For each stage of distribution rate shown in Table 1, dot overlap rates for different print duties are represented by a straight line with an inclination. For example, when the distribution rate for a first scan is 100% and that for a second scan is 0%, all multivalue data are printed by only the first scan. In that case, dots do not overlap and, if the printing rate increases, the dot overlap rate remains at 0%. As the distribution rate for the second scan is progressively increased, the dot overlap rate gradually rises with respect to the printing rate. Then, when the distribution rate is 50% each for the first and the second scan, the dot overlap rate has a maximum inclination with respect to the printing rate and, when the printing rate is 100%, becomes 50%. So, by acquiring the relationship between the distribution rate and the dot overlap rate, as shown in Table 1 and FIG. 6, in advance, a desired dot overlap rate can be realized by adjusting the distribution rate.

Referring again to FIG. 17, in this embodiment, yellow and cyan inks with relatively high levels of brightness hardly show density unevenness while black and magenta inks with relatively low levels of brightness tend to show it easily. To deal with this problem, this embodiment sets the dot overlap rates of magenta and black inks higher than those of cyan and yellow inks. For this purpose, the distribution rate setting unit 60 instructs the image data division units 64-1 to 64-4 for four colors to execute data dividing operations at different distribution rates. The image data division units 64-1 to 64-4 perform the data dividing operations at the instructed distribution rates. More specifically, the bias of the distribution rate in the black image data division unit 64-4 is set smaller than those of other color image data division units 64-1 to 64-3. Further, the bias of the distribution rate in the yellow image data division unit 64-3 is set greater than those of other color image data division units 64-1, 2, 4. For example, referring again to FIG. 6, the black distribution rate is set to 50%:50%; the magenta distribution rate to 60%:40%; the cyan distribution rate to 80%:20%; and the yellow distribution rate to 90%:10%. This enables the dot overlap rate of a relatively bright ink to be set lower than that of a relatively dark ink. As a result, an image having both of density unevenness and graininess properly adjusted in all ink colors can be produced.

Conversely, if importance is given to the graininess of an image, it is possible that the dot overlap rate of a relatively bright ink to be set higher than that of a relatively dark ink. In this case, the black distribution rate may be set to 90%:10%; the magenta distribution rate to 80%:20%; the cyan distribution rate to 60%:40%; and the yellow distribution rate to 50%:50%.

Although the distribution rates of the first and the second scan are so determined that their sum is 100%, the sum of the distribution rates of the first and the second scan may be set greater or smaller than 100% for the convenience of image processing or for improved absolute density.

Figure 7:
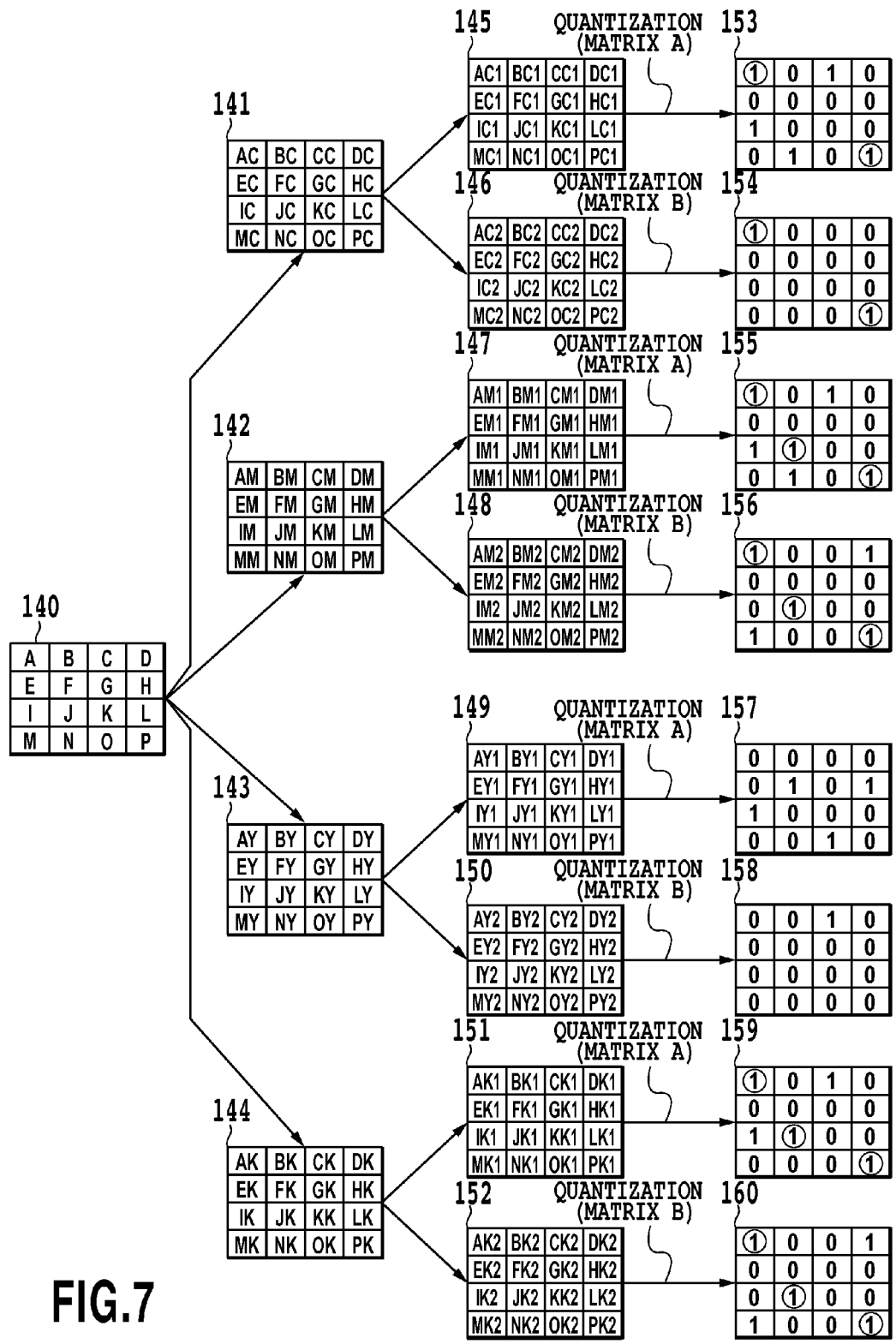
FIG. 7 is a diagram conceptually showing an example of image processing.

FIG. 7 is an imagery representing an example of the image processing shown in FIGS. 3A to 3D. Here the processing of input image data 140 corresponding to an area of 4×4 pixels or 16 pixels in total will be explained by keeping track of the process of FIGS. 3A to 3D. Symbols A to P represent a set of RGB values of input image data 140 in individual pixels. Symbols AC to PC represent multivalue data 141 for cyan dots in individual pixels generated by a color separation operation. Symbols AM to PM represent multivalue data 142 for magenta dots in individual pixels generated by the color separation operation. Symbols AY to PY represent multivalue data 143 for yellow dots in individual pixels generated by the color separation operation. Symbols AK to PK represent multivalue data 144 for black dots in individual pixels generated by the color separation operation.

In the figure, the multivalue data 141 for cyan dots correspond to the cyan multivalue data 63-1 of FIGS. 3A to 3D; and the multivalue data 142 for magenta dots correspond to the magenta multivalue data 63-2. The multivalue data 143 for yellow dots correspond to the yellow multivalue data 63-3 of FIGS. 3A to 3D; and the multivalue data 144 for black dots corresponds to the black multivalue data 63-4.

First, when the input image data 140 (RGB data) is entered into the color conversion unit 62, the color conversion unit 62 checks the three-dimensional LUT to convert the input image data 140 (RGB data) into the color-specific multivalue data 141 (CMYK data) for each pixel. The color-specific multivalue data 141-144 are then entered into the respective image data division units 64-1 to 64-4 in which they are each converted, for each pixel, into first scan multivalue data 145, 147, 149, 151 and second scan multivalue data 146, 148, 150, 152 according to a predetermined distribution rate. Then, the first scan multivalue image data for each color 145, 147, 149, 151 undergoes the error diffusion operation in the quantization unit to generate first scan quantized data for each color 153, 155, 157, 159. The second scan multivalue image data for each color 146, 148, 150, 152 undergoes the error diffusion operation in the quantization unit to generate second scan quantized data for each color 154, 156, 158, 160.

In FIG. 7, of the color-specific quantized data 153-160 for the first and the second scan, the data "1" represents an instruction to print a dot (ejection of ink) and data "0" represents an instruction not to print a dot (non-ejection of ink). As for black dots that have been distributed according to a distribution rate with little bias such as 50:50, it is seen that there are nearly equal numbers of dot-printing "1s" in the first scan binary data 159 and in the second scan binary data 160. It is also seen that the number of dots to be printed overlappingly in the same pixels (6 dots) is almost half the number of dots to be printed (10 dots), i.e., the dot overlap rate is 50%. As for yellow dots distributed according to a heavily biased distribution rate such as 90:10, the figure shows that there is a large imbalance in the number of dot-printing "1s" between the first scan binary data 157 and the second scan binary data 158. It is seen that the number of dots to be overlappingly printed in the same pixels is very small (in this example, 0 dot), i.e., the dot overlap rate is close to 0%. After this, these binary data are further divided by the division operation using a mask pattern and the divided binary data are stored in their associated buffers.

In this embodiment described above, to realize a dot overlap rate suited for the brightness level of each of a plurality of different inks, a plurality of multivalue data are generated which correspond to different scans and the binarization operation is performed on the individual pieces of multivalue data. This allows the ink colors with low brightness levels—for which there are greater concerns for density unevenness due to density variations caused by print position shifts—to have their dot overlap rates set higher than those of other ink colors with higher brightness levels. That is, by changing the dot overlap rate according to the ink color, it is possible to produce a good printed image free from any of density unevenness, graininess and insufficient density in an entire color space.

Although the color conversion unit 62 and the image data division units 64-1 to 64-4 for four colors have been described to be provided separately, with the distribution rate setting unit specifying distribution rates to the respective image data division units 64-1 to 64-4, this embodiment is not limited to this configuration. For example, a configuration may be provided in which the color conversion operation and the dividing operation are both performed simultaneously so that the RGB multivalue data can all be converted into eight planes—C1, C2, M1, M2, Y1, Y2, K1, K2—at one time. This configuration may be able to be achieved by the distribution rate setting unit instructing the distribution rates for four colors to the color conversion/dividing operations and by the color conversion/dividing operations preparing a plurality of LUTs according to the instructed distribution rates.

Second Embodiment

FIGS. 18A to 18D are block diagrams showing image processing performed in a 2-pass printing in which an image is completed in an area of interest of a print medium by two printing scans. In this embodiment, like reference numerals are used to refer to like or corresponding parts of the first embodiment.

In this embodiment the distribution rate setting unit 60 is not provided and the image data division units 64-1 to 64-4 for four colors divide the multivalue data in two at a ratio of 50:50. Then, the divided multivalue data are subjected to gradation correction operation units 71-1 to 71-8. Generally, the gradation correction operation is designed to correct multivalue data so that the density of an image printed on a print medium according to the input multivalue data can be linearly matched to the multivalue data. In this example, the gradation correction operation units 71-1 to 71-8 are also assigned a distribution rate adjusting function. More specifically, the gradation correction operation 71-1 to 71-8 performs a primary correction, according to a correction level set by the gradation correction setting unit 90, on each of the equally halved multivalue data 65-1 to 65-8. At this time, a similar effect to that of the configuration of the first embodiment shown in FIGS. 3A to 3D can be produced by the gradation correction setting unit 90 setting different correction levels for two pieces of multivalue data of the same color ink (e.g., 65-1 and 65-2). For example, if the gradation correction setting unit 90 instructs that correction levels of 1.2 and 0.8 be applied to the two pieces of multivalue data divided at a ratio of 50:50, the same effect can be produced as when the multivalue data is divided at a distribution ratio of 60:40 in the first embodiment. In this embodiment, too, the color conversion operation and the dividing operation may be performed simultaneously, as in the above embodiment.

Third Embodiment

In this embodiment, an explanation will be given to a method which properly adjusts the dot overlap rate by the image data division unit for cyan, magenta and black but which does not perform this characteristic operation for yellow.

Figure 19:
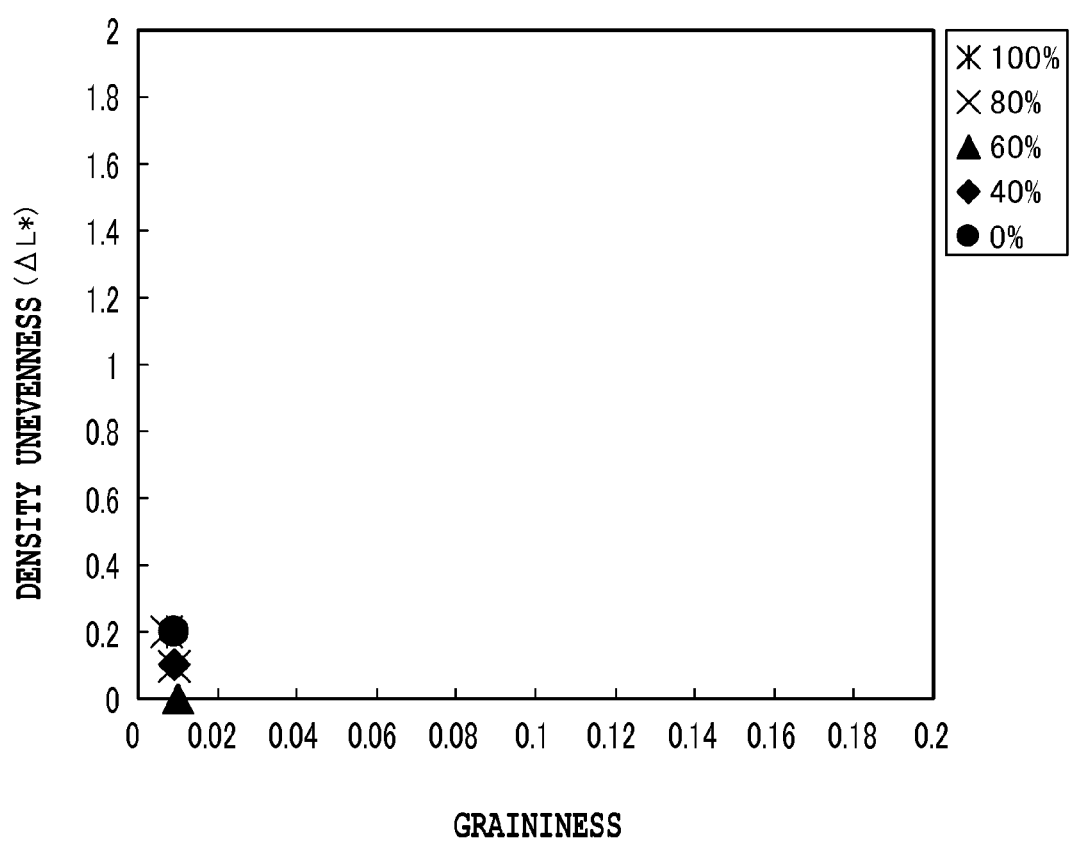
FIG. 19 is a graph showing a relation between graininess and density unevenness when a print position deviation occurs with a yellow ink.
Figure 20B:
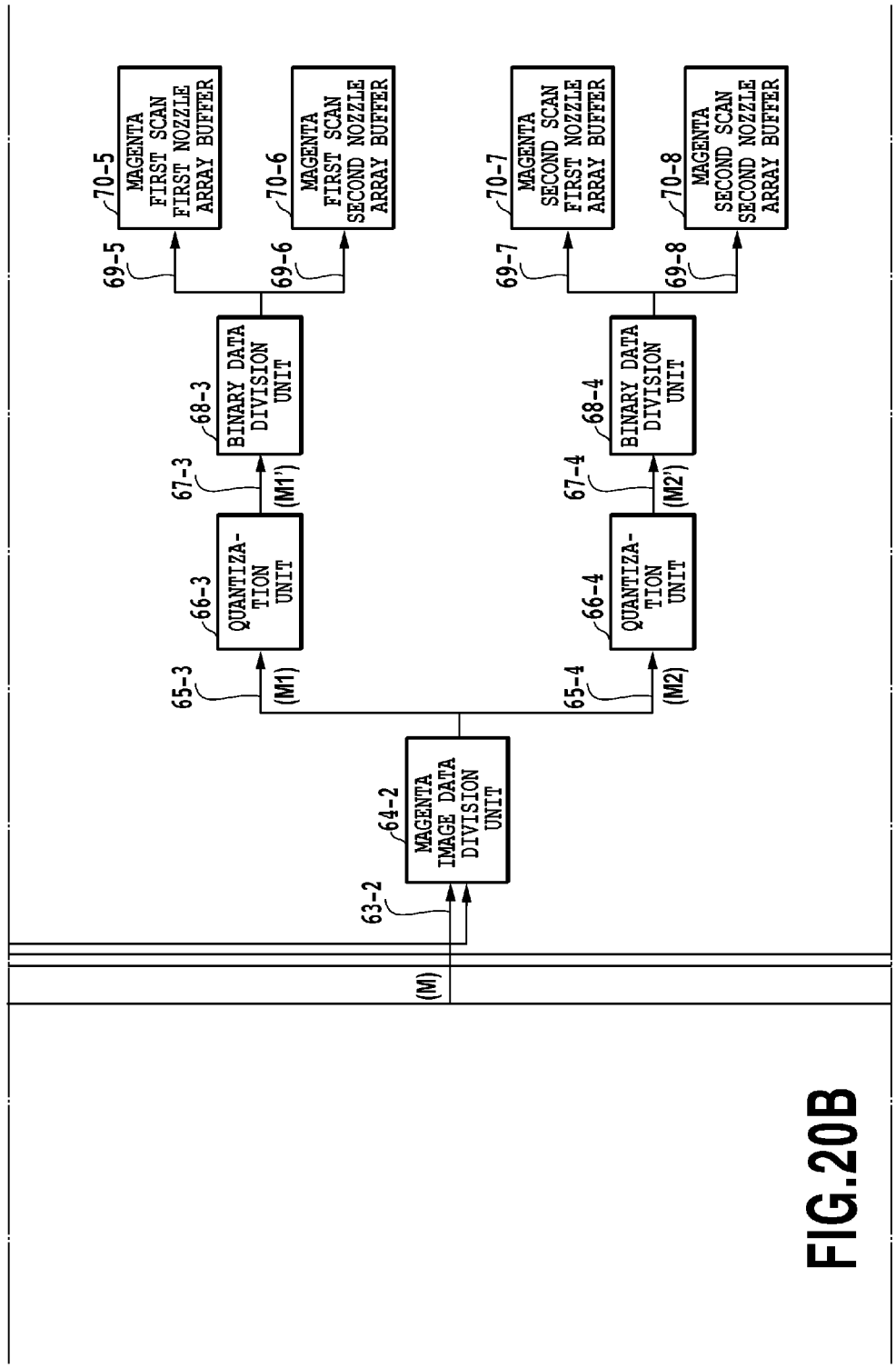
FIG. 20B is a block diagram showing image processing in a third embodiment.
Figure 20C:
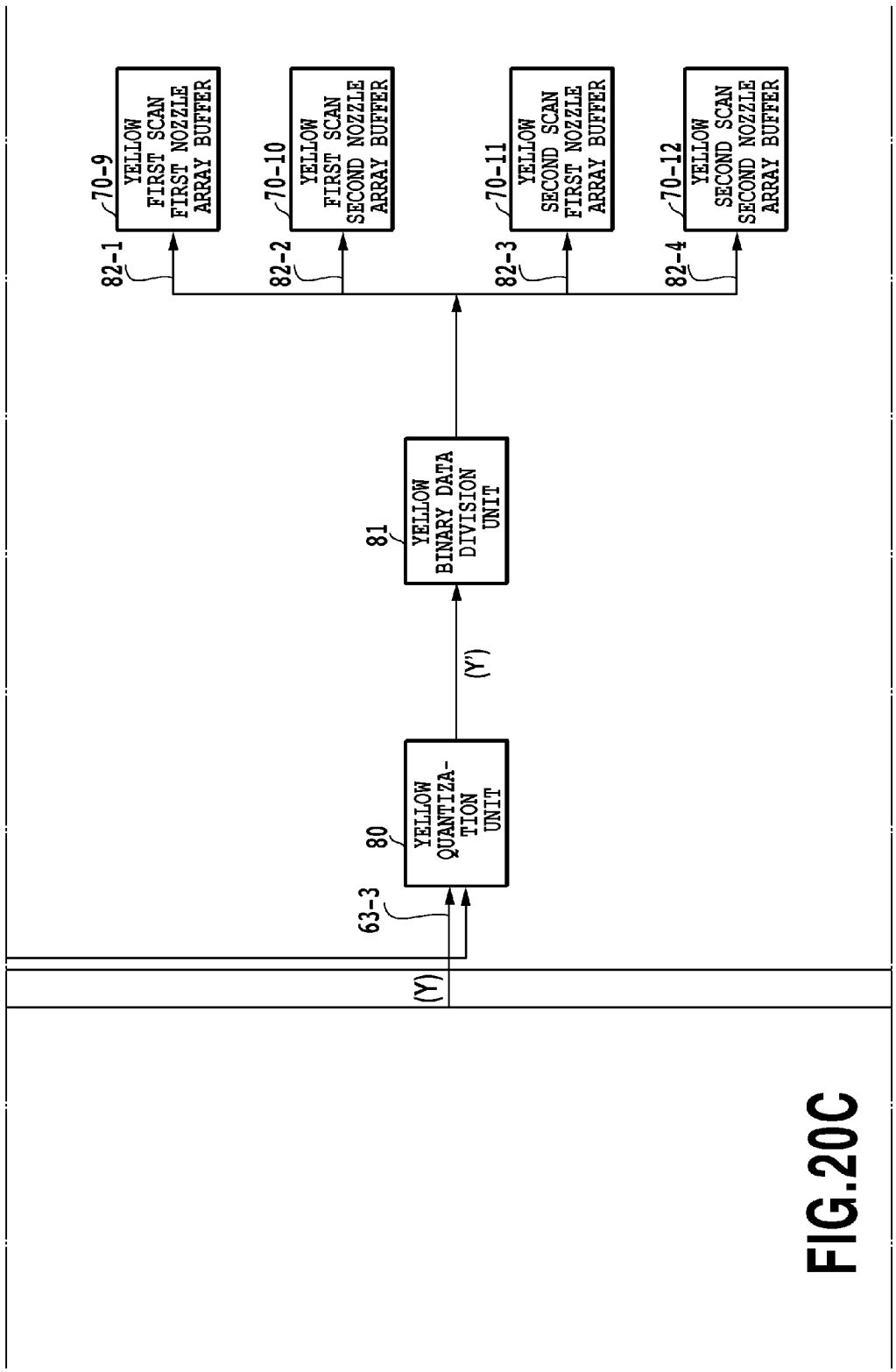
FIG. 20C is a block diagram showing image processing in a third embodiment.
Figure 20D:
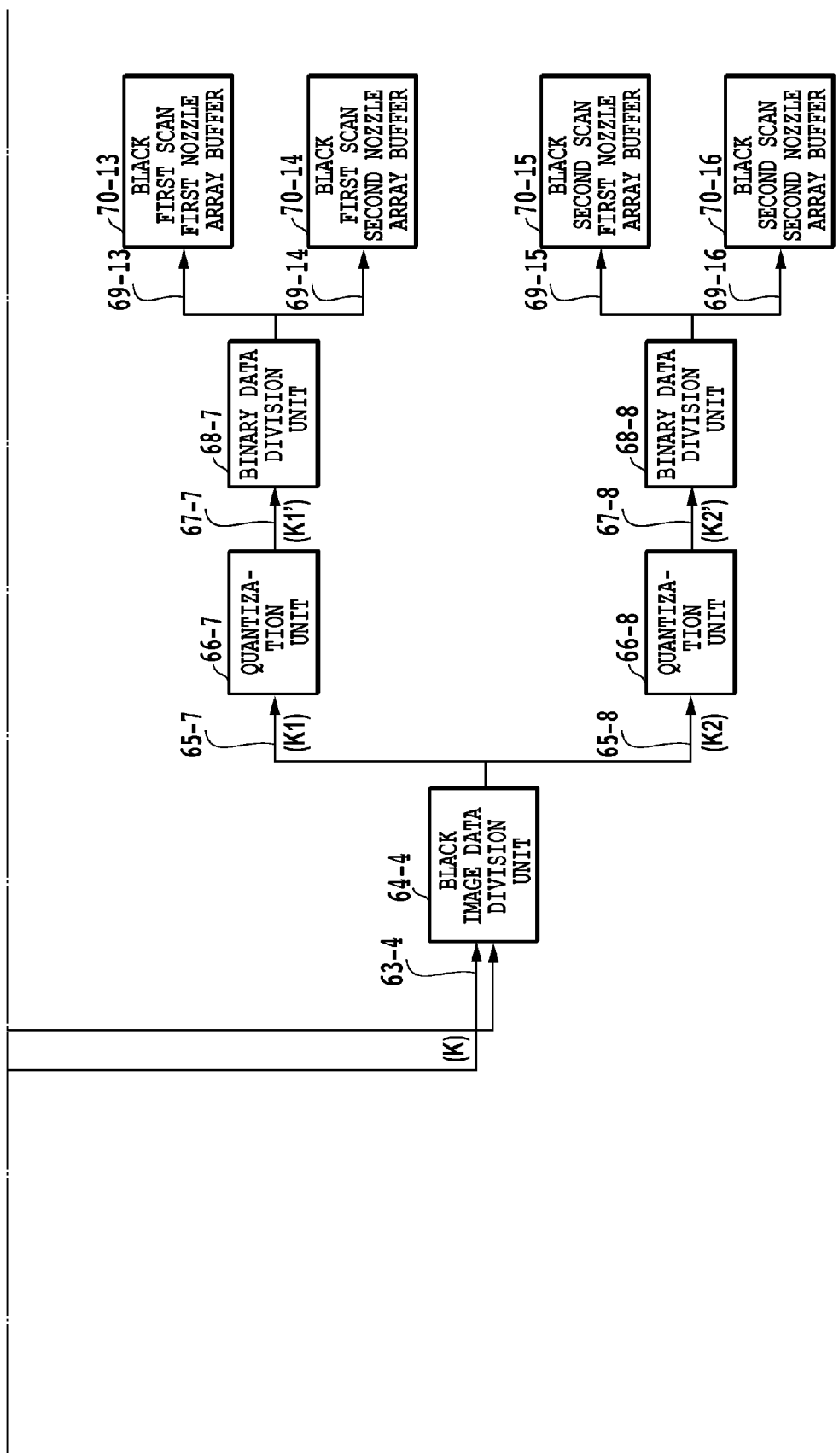
FIG. 20D is a block diagram showing image processing in a third embodiment.

FIG. 19 shows, as in FIG. 17, a relation between graininess and density unevenness for a plurality of different dot overlap rates of yellow ink when a 1-pixel shift in print position occurs between different printing scans. Here are shown such relationships when the dot overlap rate is set at 0%, 20%, 40%, 60%, 80% and 100%. As can be seen from the graph, changing of the dot overlap rate of yellow ink results in almost no changes in density unevenness and graininess. That is, the density unevenness and graininess, the issue dealt with by this invention, hardly show with yellow ink and the measures characteristic of this invention, if taken, do not produce their intended effects. So, in this embodiment, the image processing is performed in the same way as the conventional method with the yellow ink, i.e., without adjusting the dot overlap rate.

FIGS. 20A to 20D are block diagrams showing image processing performed when an image is completed in an area of interest (e.g., a pixel area) by a multipass printing using two printing scans in this embodiment. Operations identified by like reference numerals have identical or corresponding operations in the first embodiment. That is, for cyan, magenta and black, the image data division unit (first conversion unit) executes a dividing operation (first conversion step) on the multivalue data, and the quantization unit (first quantization unit) executes a quantization operation (first quantization step). In the following, the process will be explained only for yellow (Y).

The yellow multivalue data 63-3 (Y) generated by the color conversion unit 62 is entered, without being divided into first and second scan, into the yellow quantization unit 80 (second quantization unit) as is, where it is quantized by the commonly known conventional error diffusion method. As a result of this quantization operation (second quantization step), individual pixels are converted into binary data Y' indicating whether to print a yellow dot (1) or not to print it (0). Then, this image data Y' is sent to the printer engine 3004 via the IEEE 1284 bus 3022.

In the printer engine 3004, the yellow binary data division unit 81 (second conversion unit) divides the image data Y' into four planes by using a mask stored beforehand in memory (second conversion step). Here the four planes correspond to yellow first scan first nozzle array binary data, yellow first scan second nozzle array binary data, yellow second scan first nozzle array binary data and yellow second scan second nozzle array binary data, respectively. The mask used here is four masks that are in a complementary relation among them, so the four sets of binary data 82-1 to 82-4 divided by these masks do not overlap. Therefore, the probability of yellow dots formed by different scans and different nozzle arrays overlapping each other on a print medium can be minimized.

After the dividing operation using the masks, the yellow first scan first nozzle array binary data 82-1 is stored in a yellow first scan first nozzle array buffer 70-9 and then printed by the nozzle array 53 during the first scan. The yellow first scan second nozzle array binary data 82-2 is stored in a yellow first scan first nozzle array buffer 70-10 and then printed by the nozzle array 56 during the first scan. The yellow second scan first nozzle array binary data 82-3 is stored in a yellow second scan first nozzle array buffer 70-11 and then printed by the nozzle array 53 during the second scan. Further, the yellow second scan second nozzle array binary data 82-4 is stored in a yellow second scan second nozzle array buffer 70-12 and then printed by the nozzle array 56 during the second scan.

With this embodiment, for black, cyan and magenta, for which density unevenness is relatively conspicuous, the dot overlap rate is adjusted to produce an image with an increased tolerance to density variations. For yellow, on the other hand, a printing method similar to the conventional one is adopted to produce a normal image, free from problematical levels of density unevenness and graininess. Further, since this embodiment requires only one quantization unit for yellow (80), the image processing configuration can be made simple, memory capacity reduced and processing time shortened when compared with the first embodiment. Especially where the printer is low-priced and has a small memory capacity, as in the photo direct printer explained with reference to FIGS. 1A and 1B, this embodiment is particularly effective.

Although in the four-color ink configuration—cyan, magenta, yellow and black—the adjustment of dot overlap rate has been described not to be performed only with yellow, this embodiment is of course not limited to this configuration. For example, if cyan is known beforehand to keep density unevenness in the allowable range, as well as yellow, the adjustment of dot overlap rate may be done only with black and magenta. Further, if light inks with high brightness levels (photo inks) such as light cyan and light magenta are used and known to keep their density unevenness inconspicuous, the dot overlap rate adjustment may not be performed also with these inks.

To summarize, this embodiment can produce an intended advantage by making adjustment of the dot overlap rate for those ink colors which tend to pose a density unevenness problem and, for ink colors for which the density unevenness hardly poses a problem, adopting the conventional printing method. That is, it is possible to produce a desirable image that keeps the dot overlap rates for ink colors within appropriate ranges without unnecessarily increasing the burden of processing. In this embodiment, too, the color conversion and dividing operations may be performed simultaneously, as in the foregoing embodiments.

Fourth Embodiment

In the preceding embodiments, the dot overlap rate is controlled by differentiating the distribution rate among the color-specific image data division units 64-1 to 64-4, or the correction value among the gradation correction units 71-1 to 71-4, to bias the multivalue data entered into the quantization operation. As opposed to the above method, this embodiment controls the dot overlap rate by making a unique provision in the quantization operation when quantizing a plurality of pieces of generated multivalue density data. The multivalue data entered into the quantization operation may be equal in magnitude or biased as in the above embodiment. That is, the dot overlap rate may be adjusted by only the quantization unit or by the coordinated operation of the quantization unit and the image data division unit or the gradation correction unit.

FIGS. 12A to 12D are block diagrams showing image processing performed when an image is completed in an area of interest on a print medium by a multipass printing using two printing scans in this embodiment. Here it is assumed that a series of processing represented by blocks 21-26 is performed by the control unit 3000 of FIG. 2 on image data supplied from an image input device such as digital camera 3012.

RGB multivalue (256-value) image data is entered into a multivalue image data input unit 21 from an external device. The input image data (multivalue RGB data) is converted, for each pixel, into four sets of multivalue image data (multivalue density data) corresponding to four ink colors (CMYK) by a color conversion unit 22. The processing so far is similar to that of the above embodiment.

Image data division units 24-1 to 24-4 divide (or convert) multivalue data 23-1 to 23-4 into first scan multivalue data (C1, M1, Y1, K1) and second scan multivalue data (C2, M2, Y2, K2). In this embodiment, the distribution rates of the color-specific division units 24-1 to 24-4 all may be 50:50. However, as in the preceding embodiments, the method of adjusting the distribution rate may additionally be employed to control the dot overlap rate. The following explanation takes up black multivalue data (K1, K2) as an example. In this embodiment, too, both of the color conversion operation and the division operation may be executed simultaneously, as in the preceding embodiments.

Black quantization unit 26-4 performs a binarization (quantization) operation on black first scan multivalue data 25-7 (K1) and black second scan multivalue data 25-8 (K2). That is, these multivalue data are converted (quantized) into either 0 or 1 to become black first scan binary data K1' 27-7 and black second scan binary data K2' 27-8. At this time, in pixels having both of K1' and K2' set to be 1, two black dots are overlappingly printed. In pixels having both K1' and K2' set to be 0, no black dots are formed. Further, those pixels with either K1' or K2' set to be 1 are printed with only one black dot. This also applies to quantization units 26-1 to 26-3 for other colors. In this embodiment, the dot overlap rates for four colors are differentiated by differentiating the quantization method among the color-specific quantization units 26-1 to 26-4. The processes executed in the individual quantization units 26-1 to 26-4 will be explained in the following by referring to the flow chart of FIG. 10 for an example case of black (K).

Figure 10:
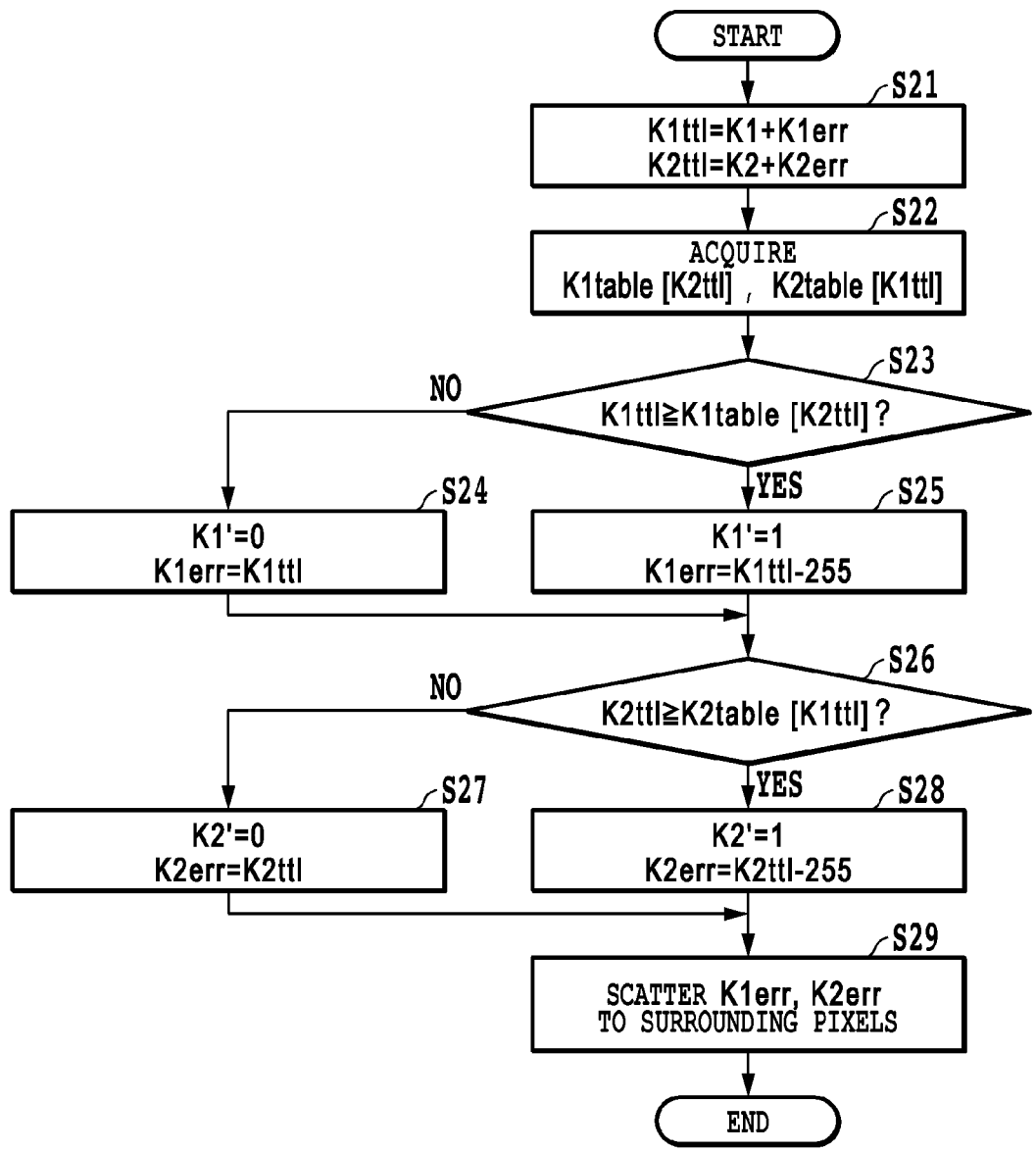
FIG. 10 is a flow chart showing a process of quantization.

In FIG. 10, two pieces of input multivalue data K1 and K2, the subjects to be quantized, have a value of between 0 and 255. Here K1err and K1err refer to accumulated error values produced from surrounding pixels that have already undergone the quantization operation. K1ttl and K2ttl are sum values of the input multivalue data and the accumulated error values. Further K1' and K2' in the flow chart refer to binarized data for first printing scan and the second printing scan.

In this process, thresholds (quantization parameters) used to determine the values of the binarized data K1' and K2' are set to vary depending on the values of K1ttl and K2ttl. So, a table is prepared beforehand which determines a unique threshold according to the value of K1ttl or K2ttl. Here, let a threshold to be compared with K1ttl in determining K1' be K1table[K2ttl] and a threshold to be compared with K2ttl in determining K2' be K2table[K1ttl]. K1table[K2ttl] is a value determined by the value of K2ttl, and K2table[K1ttl] is a value determined by the value of K1ttl.

This process is executed as follows. First, step S21 adds the accumulated error values K1err, K2err to the input multivalue data K1, K2 to calculate K1ttl and K2ttl. Next, step S22 refers to a threshold table shown in Table 2 and, based on K1ttl and K2ttl determined by step S21, acquires two thresholds K1table[K2ttl], K2table[K1ttl]. The threshold K1table[K2ttl] is uniquely determined by using K2ttl as a "reference value" in the threshold table of Table 2. The threshold K2table[K1ttl] is uniquely determined by using K1ttl as a "reference value" in the threshold table of Table 2.

Subsequent steps S23-S25 determine the value of K1' and steps S26-S28 determine the value of K2'. More specifically, step S23 checks if K1ttl calculated by step S21 is equal to or greater than the threshold K1table[K2ttl] acquired by step S22. If K1ttl is found to be equal to or greater than the threshold, K1'=1. Based on this output value (K1'=1), the accumulated error value K1err (=K1ttl−255) is calculated and updated (step S25). If K1ttl is found to be less than the threshold, K1' is determined to be K1'=0. Based on this output value (K1'=0), the accumulated error value K1err (=K1ttl) is calculated and updated (step S24).

Next, step S26 checks if K2ttl calculated by step S21 is equal to or greater than the threshold K2table[K1ttl] acquired by step S22. If K2ttl is found to be equal to or greater than the threshold, K2'=1. Based on this output value (K2'=1), the accumulated error value K2err (=K2ttl−255) is calculated and updated (step S28). If K2ttl is found to be less than the threshold, K2' is determined to be K2'=0. Based on this output value (K2'=0), the accumulated error value K2err (=K2ttl) is calculated and updated (step S27).

Then, step S29, according to the error diffusion matrices shown in FIG. 8A and FIG. 8B, spreads the updated accumulated error values K1err and K2err to those surrounding pixels that have yet to be quantized. In this embodiment, to spread the accumulated error value K1err to the surrounding pixels, the error diffusion matrix of FIG. 8A is used; and, to spread the accumulated error value K2err to the surrounding pixels, the error diffusion matrix of FIG. 8B is used.

As described above, this embodiment uses the second multivalue data (K2ttl) for the second scan in determining the threshold (quantization parameter) used to quantize the first multivalue data (K1*ttl*) for the first scan. Similarly, the first multivalue data (K1*ttl*) for the first scan is used in determining the threshold (quantization parameter) used to quantize the second multivalue data (K2*ttl*) for the second scan. That is, the quantization operations on the multivalue data that corresponds to one scan of the two scans and the quantization processing of multivalue data that corresponds to the other scan of the two scans are performed based on both the multivalue data that corresponds to the one scan and the multivalue data that corresponds to the other scan. This makes it possible to minimize the possibility of the pixels printed with a dot of one size in one of the two scans being printed with a dot of the same size in the other scan, or conversely to positively increase that possibility. As a result, density unevenness can be minimized by striking an appropriate balance between it and graininess degradation and density insufficiency.

FIG. 13A shows the result of performing the quantization operation (binarization operation) using the thresholds in a "FIG. 13A" column in the threshold table of Table 2 according to the flow chart of FIG. 10, as related to input values (K1*ttl* and K2*ttl*). K1*ttl* and K2*ttl* both can take a value between 0 and 255, to be printed (1) or not to be printed (0) is determined with a threshold of 128 as a boundary, as shown in the "FIG. 13A" column in the threshold table. A point 221 in the figure represents a boundary point between an area where no dot is to be printed (K1'=0 and K2'=0) and an area where two dots overlap (K1'=1 and K2'=1).

FIG. 13B shows the result of the quantization operation (binarization operation) executed by using thresholds in a "FIG. 13B" column in the threshold table of Table 2 according to the flow chart of FIG. 10, as related to input values (K1*ttl* and K2*ttl*). A point 231 in the figure represents a boundary point between an area where no dot is to be printed (K1'=0 and K2'=0) and an area where only one dot is formed (K1'=1 and K2'=0, or K1'=0 and K2'=1). A point 232 is a boundary between an area where two dots are overlappingly printed (K1'=1 and K2'=1) and an area where only one dot is formed (K1'=1 and K2'=0, or K1'=0 and K2'=1). Since the points 231 and 232 are spaced some distance apart, the area where only one dot is printed increases while the area where both dots are formed decreases, when compared with the arrangement of FIG. 13A. That is, the arrangement of FIG. 13B renders the dot overlap rate lower than that of FIG. 13A and is therefore advantageous in minimizing graininess. If there is a point at which the dot overlap rate changes sharply as in FIG. 13A, density unevenness can result even when the gradation changes only slightly. In the arrangement of FIG. 13B, however, the dot overlap rate changes smoothly with the gradation, so density unevenness hardly occurs.

As described above, the threshold used in the quantization operation affects the dot overlap rate after printing. Thus, by changing the threshold according to ink color, the dot overlap rate can be adjusted according to the ink color. For example, the quantization operation shown in FIG. 13B may be employed in the cyan quantization operation 26-1 to keep graininess low in cyan low-density regions. Further, the quantization operation shown in FIG. 13E may be employed in the black quantization operation 26-4 to restrain density variations in black medium-to-high density regions. Conversely, by adopting the quantization operation of FIG. 13B in the black quantization operation 26-4, insufficient density can be avoided in black high density regions. Further, adopting the quantization operation of FIG. 13E in the cyan quantization operation 26-1 can keep density variations low in cyan low-to-medium density regions.

Some example thresholds used to realize different dot overlap rates will be explained by referring to FIG. 13C through FIG. 13G. In this embodiment, a quantization operation that can produce an optimal dot overlap rate need only be selected for each of the quantization operations 26-1 to 26-4 for four colors. FIGS. 13C-13G show the results of the quantization (K1' and K2') using the thresholds listed in the threshold table of Table 2, as related to the input values (K1*ttl* and K2*ttl*), as in the case of FIG. 13A and FIG. 13B.

FIG. 13C shows an arrangement that puts the dot overlap rate at an intermediate value between FIG. 13A and FIG. 13B. A point 241 is placed at an intermediate point between the pint 221 of FIG. 13A and the point 231 of FIG. 13B. A point 242 is set at an intermediate point between the point 221 of FIG. 13A and the point 232 of FIG. 13B.

FIG. 13D shows an arrangement that reduces the dot overlap rate more than FIG. 13B does. A point 251 is set at an externally dividing point that externally divides the distance between the point 221 of FIG. 13A and the point 231 of FIG. 13B at an external ratio of 3:2. A point 252 is set at an externally dividing point that externally divides the distance between the point 221 of FIG. 13A and the point 232 of FIG. 13B at an external ratio of 3:2.

FIG. 13E shows an arrangement that renders the dot overlap rate higher than that of FIG. 13A. The arrangement of FIG. 13E makes more likely the transition from regions where no dot is printed (K1'=0 and K2'=0) to regions where two dots are overlappingly printed (K1'=1 and K2'=1), increasing the dot overlap rate. FIG. 13F shows an arrangement that puts the dot overlap rate at a value between FIG. 13A and FIG. 13E. FIG. 13G shows an arrangement that renders the dot overlap rate even higher than that of FIG. 13E.

Next, a detailed explanation will be given about the method of quantization using the thresholds shown in Table 2. Table 2 is a threshold table from which step S22 in the flow chart of FIG. 10 acquires an appropriate threshold to realize the results of processing shown in FIGS. 13A-13G.

Here an example case will be taken up which has input values (K1*ttl*, K2*ttl*) of (100, 120) and uses thresholds listed in a "FIG. 13B" column of the threshold table. First, step S22 in FIG. 10 determines a threshold K1table[K2*ttl*] based on the threshold table (Table 2) and K2*ttl* (reference value). If the reference value (K2*ttl*) is "120", K1table[K2*ttl*] is "120". Similarly, a threshold K2table[K1*ttl*] is determined based on the threshold table and K1*ttl* (reference value). If the reference value (K1*ttl*) is "100", threshold K2table[K1*ttl*] is "101". Next, step S23 in FIG. 10 compares K1*ttl* and the threshold K1table[K2*ttl*]. Since K1*ttl* (=100)<threshold K1table[K2*ttl*] (=120), K1'=0 (step S24). Similarly, step S26 in FIG. 10 compares K2*ttl* and the threshold K2table[K1*ttl*]. Since K2*ttl* (=120) threshold K2table[K1*ttl*] (=101), K2'=1 (step S28). As a result, if (K1*ttl*, K2*ttl*)=(100, 120), then (K1', K2')=(0, 1), as shown in FIG. 13B.

According to the quantization operation as described above, the dot overlap rate is controlled between two scans by quantizing the multivalue data that correspond to the two scans based on both of the multi-value data corresponding to the two scans. This allows the dot overlap rate between the dots printed by one of the two scans and the dots printed by the other scan to be kept within an appropriate range according to ink color. That is, by adjusting the dot overlap rate according to ink color, it is possible to produce a satisfactory image free of density unevenness, graininess and insufficient density in the entire color gamut.

Although Table 2 shows every fourth reference value, the actual table provides thresholds (e.g., 1-3 thresholds) between these discrete reference values. It is also possible to have a table like Table 2, in which only discontinued or separate reference values are presented, and to obtain a threshold for any reference value between the presented ones by interpolating the thresholds of the nearest reference values.

TABLE 2

| | FIG. 13A | | FIG. 13B | | FIG. 13C | | FIG. 13D | | FIG. 13E | | FIG. 13F | | FIG. 13G | |
|---|---|---|---|---|---|---|---|---|---|---|---|---|---|---|
| | K1 | K2 | K1 | K2 | K1 | | | | | | | | | |
| ref. | table | table | table | table | table | K2 table | K1 table | K2 table | K1 table | K2 table | K1 table | K2 table | K1 table | K2 table |
| 0 | 128 | 128 | 128 | 128 | 128 | 128 | 128 | 128 | 127 | 127 | 127 | 127 | 127 | 127 |
| 4 | 128 | 128 | 124 | 124 | 126 | 126 | 116 | 116 | 131 | 131 | 129 | 129 | 139 | 139 |
| 8 | 128 | 128 | 120 | 120 | 125 | 125 | 104 | 104 | 135 | 135 | 130 | 130 | 151 | 151 |
| 12 | 128 | 128 | 116 | 116 | 124 | 124 | 92 | 92 | 139 | 139 | 131 | 131 | 163 | 163 |
| 16 | 128 | 128 | 112 | 112 | 122 | 122 | 80 | 80 | 143 | 143 | 133 | 133 | 175 | 175 |
| 20 | 128 | 128 | 108 | 108 | 121 | 121 | 68 | 68 | 147 | 147 | 134 | 134 | 187 | 187 |
| 24 | 128 | 128 | 104 | 104 | 120 | 120 | 56 | 56 | 151 | 151 | 135 | 135 | 199 | 199 |
| 28 | 128 | 128 | 100 | 100 | 118 | 118 | 44 | 44 | 155 | 155 | 137 | 137 | 211 | 211 |
| 32 | 128 | 128 | 96 | 96 | 117 | 117 | 32 | 33 | 159 | 159 | 138 | 138 | 223 | 222 |
| 36 | 128 | 128 | 92 | 92 | 116 | 116 | 36 | 37 | 163 | 163 | 139 | 139 | 219 | 218 |
| 40 | 128 | 128 | 88 | 88 | 114 | 114 | 40 | 41 | 167 | 167 | 141 | 141 | 215 | 214 |
| 44 | 128 | 128 | 84 | 84 | 113 | 113 | 44 | 45 | 171 | 171 | 142 | 142 | 211 | 210 |
| 48 | 128 | 128 | 80 | 80 | 112 | 112 | 48 | 49 | 175 | 175 | 143 | 143 | 207 | 206 |
| 52 | 128 | 128 | 76 | 76 | 110 | 110 | 52 | 53 | 179 | 179 | 145 | 145 | 203 | 202 |
| 56 | 128 | 128 | 72 | 72 | 109 | 109 | 56 | 57 | 183 | 183 | 146 | 146 | 199 | 198 |
| 60 | 128 | 128 | 68 | 68 | 108 | 108 | 60 | 61 | 187 | 187 | 147 | 147 | 195 | 194 |
| 64 | 128 | 128 | 64 | 65 | 106 | 106 | 64 | 65 | 191 | 190 | 149 | 149 | 191 | 190 |
| 68 | 128 | 128 | 68 | 69 | 105 | 105 | 68 | 69 | 187 | 186 | 150 | 150 | 187 | 186 |
| 72 | 128 | 128 | 72 | 73 | 104 | 104 | 72 | 73 | 183 | 182 | 151 | 151 | 183 | 182 |
| 76 | 128 | 128 | 76 | 77 | 102 | 102 | 76 | 77 | 179 | 178 | 153 | 153 | 179 | 178 |
| 80 | 128 | 128 | 80 | 81 | 101 | 101 | 80 | 81 | 175 | 174 | 154 | 154 | 175 | 174 |
| 84 | 128 | 128 | 84 | 85 | 100 | 100 | 84 | 85 | 171 | 170 | 155 | 155 | 171 | 170 |
| 88 | 128 | 128 | 88 | 89 | 98 | 98 | 88 | 89 | 167 | 166 | 157 | 157 | 167 | 166 |
| 92 | 128 | 128 | 92 | 93 | 97 | 97 | 92 | 93 | 163 | 162 | 158 | 158 | 163 | 162 |
| 96 | 128 | 128 | 96 | 97 | 96 | 97 | 96 | 97 | 159 | 158 | 159 | 158 | 159 | 158 |
| 100 | 128 | 128 | 100 | 101 | 100 | 101 | 100 | 101 | 155 | 154 | 155 | 154 | 155 | 154 |
| 104 | 128 | 128 | 104 | 105 | 104 | 105 | 104 | 105 | 151 | 150 | 151 | 150 | 151 | 150 |
| 108 | 128 | 128 | 108 | 109 | 108 | 109 | 108 | 109 | 147 | 146 | 147 | 146 | 147 | 146 |
| 112 | 128 | 128 | 112 | 113 | 112 | 113 | 112 | 113 | 143 | 142 | 143 | 142 | 143 | 142 |
| 116 | 128 | 128 | 116 | 117 | 116 | 117 | 116 | 117 | 139 | 138 | 139 | 138 | 139 | 138 |
| 120 | 128 | 128 | 120 | 121 | 120 | 121 | 120 | 121 | 135 | 134 | 135 | 134 | 135 | 134 |
| 124 | 128 | 128 | 124 | 125 | 124 | 125 | 124 | 125 | 131 | 130 | 131 | 130 | 131 | 130 |
| 128 | 128 | 128 | 128 | 129 | 128 | 129 | 128 | 129 | 127 | 126 | 127 | 126 | 127 | 126 |
| 132 | 128 | 128 | 132 | 133 | 132 | 133 | 132 | 133 | 123 | 122 | 123 | 122 | 123 | 122 |
| 136 | 128 | 128 | 136 | 137 | 136 | 137 | 136 | 137 | 119 | 118 | 119 | 118 | 119 | 118 |
| 140 | 128 | 128 | 140 | 141 | 140 | 141 | 140 | 141 | 115 | 114 | 115 | 114 | 115 | 114 |
| 144 | 128 | 128 | 144 | 145 | 144 | 145 | 144 | 145 | 111 | 110 | 111 | 110 | 111 | 110 |
| 148 | 128 | 128 | 148 | 149 | 148 | 149 | 148 | 149 | 107 | 106 | 107 | 106 | 107 | 106 |
| 152 | 128 | 128 | 152 | 153 | 152 | 153 | 152 | 153 | 103 | 102 | 103 | 102 | 103 | 102 |
| 156 | 128 | 128 | 156 | 157 | 156 | 157 | 156 | 157 | 99 | 98 | 99 | 98 | 99 | 98 |
| 160 | 128 | 128 | 160 | 161 | 157 | 158 | 160 | 161 | 95 | 94 | 97 | 97 | 94 | 95 |
| 164 | 128 | 128 | 164 | 165 | 159 | 159 | 164 | 165 | 91 | 90 | 96 | 96 | 91 | 90 |
| 168 | 128 | 128 | 168 | 169 | 157 | 157 | 168 | 169 | 87 | 86 | 98 | 98 | 87 | 86 |
| 172 | 128 | 128 | 172 | 173 | 156 | 156 | 172 | 173 | 83 | 82 | 99 | 99 | 83 | 82 |
| 176 | 128 | 128 | 176 | 177 | 155 | 155 | 176 | 177 | 79 | 78 | 100 | 100 | 79 | 78 |
| 180 | 128 | 128 | 180 | 181 | 153 | 153 | 180 | 181 | 75 | 74 | 102 | 102 | 75 | 74 |
| 184 | 128 | 128 | 184 | 185 | 152 | 152 | 184 | 185 | 71 | 70 | 103 | 103 | 71 | 70 |
| 188 | 128 | 128 | 188 | 189 | 151 | 151 | 188 | 189 | 67 | 66 | 104 | 104 | 67 | 66 |
| 192 | 128 | 128 | 191 | 191 | 149 | 149 | 192 | 193 | 64 | 64 | 106 | 106 | 63 | 62 |
| 196 | 128 | 128 | 187 | 187 | 148 | 148 | 196 | 197 | 68 | 68 | 107 | 107 | 59 | 58 |
| 200 | 128 | 128 | 183 | 183 | 147 | 147 | 200 | 201 | 72 | 72 | 108 | 108 | 55 | 54 |
| 204 | 128 | 128 | 179 | 179 | 145 | 145 | 204 | 205 | 76 | 76 | 110 | 110 | 51 | 50 |
| 208 | 128 | 128 | 175 | 175 | 144 | 144 | 208 | 209 | 80 | 80 | 111 | 111 | 47 | 46 |
| 212 | 128 | 128 | 171 | 171 | 143 | 143 | 212 | 213 | 84 | 84 | 112 | 112 | 43 | 42 |
| 216 | 128 | 128 | 167 | 167 | 141 | 141 | 216 | 217 | 88 | 88 | 114 | 114 | 39 | 38 |
| 220 | 128 | 128 | 163 | 163 | 140 | 140 | 220 | 221 | 92 | 92 | 115 | 115 | 35 | 34 |
| 224 | 128 | 128 | 159 | 159 | 139 | 139 | 222 | 222 | 96 | 96 | 116 | 116 | 33 | 33 |
| 228 | 128 | 128 | 155 | 155 | 137 | 137 | 210 | 210 | 100 | 100 | 118 | 118 | 45 | 45 |
| 232 | 128 | 128 | 151 | 151 | 136 | 136 | 198 | 198 | 104 | 104 | 119 | 119 | 57 | 57 |
| 236 | 128 | 128 | 147 | 147 | 135 | 135 | 186 | 186 | 108 | 108 | 120 | 120 | 69 | 69 |
| 240 | 128 | 128 | 143 | 143 | 133 | 133 | 174 | 174 | 112 | 112 | 122 | 122 | 81 | 81 |
| 244 | 128 | 128 | 139 | 139 | 132 | 132 | 162 | 162 | 116 | 116 | 123 | 123 | 93 | 93 |
| 248 | 128 | 128 | 135 | 135 | 131 | 131 | 150 | 150 | 120 | 120 | 124 | 124 | 105 | 105 |
| 252 | 128 | 128 | 131 | 131 | 129 | 129 | 138 | 138 | 124 | 124 | 126 | 126 | 117 | 117 |
| 255 | 128 | 128 | 128 | 128 | 129 | 129 | 129 | 129 | 127 | 127 | 126 | 126 | 126 | 126 |

Let us return to FIGS. 12A to 12D. Once the binary data K1' and K2' that realize the dot overlap rate suited for black are obtained by the black quantization unit 26-4, these data are sent to the printer engine 3004 of FIG. 2 via IEEE 1284 bus 3022. The same process applies to other ink colors. The subsequent processing is executed by the printer engine 3004.

In the printer engine 3004, the binary data K1' 27-7 is transferred to a black first scan binary data division unit 28-7. The black first scan binary data division unit 28-7 performs a dividing operation on the two nozzle arrays 54, 55 capable of ejection black ink, by using a mask stored beforehand in memory. The binary data K2' 27-8 is transferred to a black second scan binary data division unit 28-8. The black second scan binary data division unit 28-8 performs a dividing operation on the two nozzle arrays 54, 55 capable of ejecting black ink, by using the mask stored beforehand in memory. After the dividing operations, the black first scan first nozzle array binary data 29-13 is stored in a black first scan first nozzle array buffer 30-13 and then printed by the nozzle array 54 in the first scan. The black first scan second nozzle array binary data 29-14 is stored in a black first scan second nozzle array buffer 30-14 and printed by the nozzle array 55 in the first scan. The black second scan first nozzle array binary data 29-15 is stored in a black second scan first nozzle array buffer 30-15 and printed by the nozzle array 54 in the second scan. Further, the black second scan second nozzle array binary data 29-16 is stored in a black second scan second nozzle array buffer 30-16 and printed by the nozzle array 55 in the second scan. The similar operation is performed for other ink colors.

With the above sequence of operations, dot overlap rates suited for individual colors can be realized by selecting an appropriate threshold table for each color from among a plurality of threshold table shown in FIGS. 13A-13G. As a result, a satisfactory image can be produced which avoids density unevenness, graininess and density insufficiency in the entire color gamut.

It is noted that the quantization procedure is not necessarily limited to the one described above in which the decision on the printing (1) and the non-printing (0) is made by the comparison of the data with a threshold. For example, in the case of two planes, a table may be prepared which directly converts K1' and K2' into "1" for printing or "0" for non-printing by using both of K1*ttl* and K2*ttl* as reference values. Detailed description of this table is omitted here, but the use of such a multidimensional table offers an advantage of being able to control the dot overlap rate with a greater degree of freedom in a more simple manner. When a one-dimensional threshold table such as Table 2 is used, the table can be prepared with a smaller memory capacity. It is also possible to use a one-dimensional threshold table with the sum of K1*ttl* and K2*ttl* as a reference value. Further, the binarization (quantization) may be performed only by branching and computation without using a table at all. In that case, if some coefficient used in the computation is set at a value that realizes a desired dot overlap rate, the intended advantage of this embodiment can be obtained. This can reduce the memory capacity even further when compared with cases where the above table is prepared.

Fifth Embodiment

In recent years, a printing process has been adopted in which main image processing is performed at a lower (coarser) resolution than the printing resolution and in which 256-grayscale multivalue image data is converted into a smaller-grayscale L-value data (L is 3 or higher) before being sent to the printer engine of the printing apparatus. In that case, the printer engine has a dot pattern (index pattern) in memory that converts the received smaller-grayscale L-value data into binary data conforming to the printing resolution. In the following, an example case of converting the 256-value image data into 3-value data will be explained. The value of L can of course take any other value not smaller than 3.

FIGS. 15A to 15D are block diagrams showing image processing performed during a multipass printing which completes an image in an area of interest (e.g., pixel area) by two printing scans. The process from the multivalue image data input unit 41 up to the color-specific image data division units 44-1 to 44-4 is equivalent to those shown in FIGS. 3A to 3D and FIGS. 12A to 12D. The processing that follows is done for individual colors independently and parallelly. So, the following explanation is given for only black (K) as an example. It is noted that this embodiment may perform the color conversion operation and the dividing operation simultaneously, as in the preceding embodiments.

The black multivalue data K 43-4 is divided (converted) by a black image data division unit 44-4 into black first scan multivalue data K1 45-7 and black second scan multivalue data K2 45-8. At this time, this embodiment may distribute the multivalue data with a distribution rate biased toward the first scan or the second scan, or evenly distributed, as in the first and the third embodiment.

The black first scan multivalue data K1 and the black second scan multivalue data K2 are entered into a black quantization unit 46-4 that quantizes the input data into three-value black first scan quantized data K1' and three-value black second scan quantized data K2'. More specifically, in a first step, to two pieces of multivalue data K1, K2 of a pixel of interest are added accumulated errors of adjoining pixels to obtain K1*ttl* and K2*ttl*, as in the quantization operation of the fourth embodiment. Then, a threshold to be used in quantizing the first scan multivalue data K1 is determined based on K2*ttl*, and a threshold to be used in quantizing the second scan multivalue data K2 is determined based on K1*ttl*. Since this embodiment quantizes the image data into 3-value data, two thresholds—a first threshold and a second threshold larger than the first—are prepared. Then, depending on the magnitude relationship between a sum of the input multivalue data of the pixel of interest and the accumulated error value (sum of K1*ttl* and K2*ttl*) and the first and the second threshold, an output value is determined. That is, if the sum is equal to or greater than the second threshold, the output value is "2". If the sum is equal to or greater than the first threshold and less than the second threshold, the output value is "1". If the sum is less than the first threshold, the output is "0".

As described above, based on a threshold determined using K2*ttl*, the first scan multivalue data K1 is quantized to obtain the first scan quantized data K1'. Similarly, based on a threshold determined using K*ttl*, the second scan multivalue data K2 is quantized to obtain the second scan quantized data K2'. The first threshold and the second threshold can be determined individually from a first threshold table and a second threshold table by using the same reference value. The operation described above also applies to the other color-specific quantization units 46-1 to 46-3.

Figure 14:
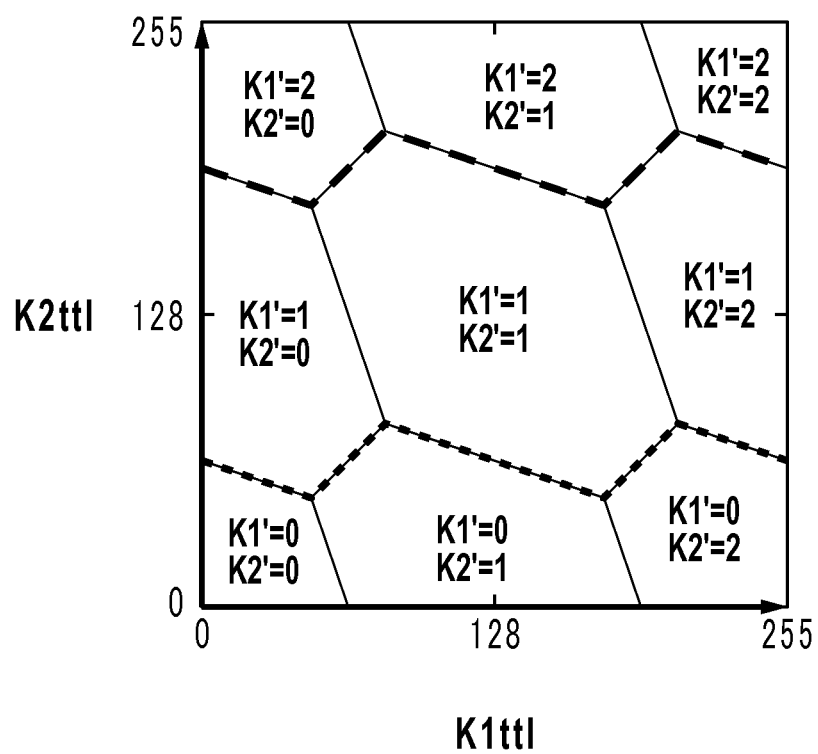
FIG. 14 is a diagram showing a relation between an input value and the result of quantization (into 3-value data)
Figure 15B:
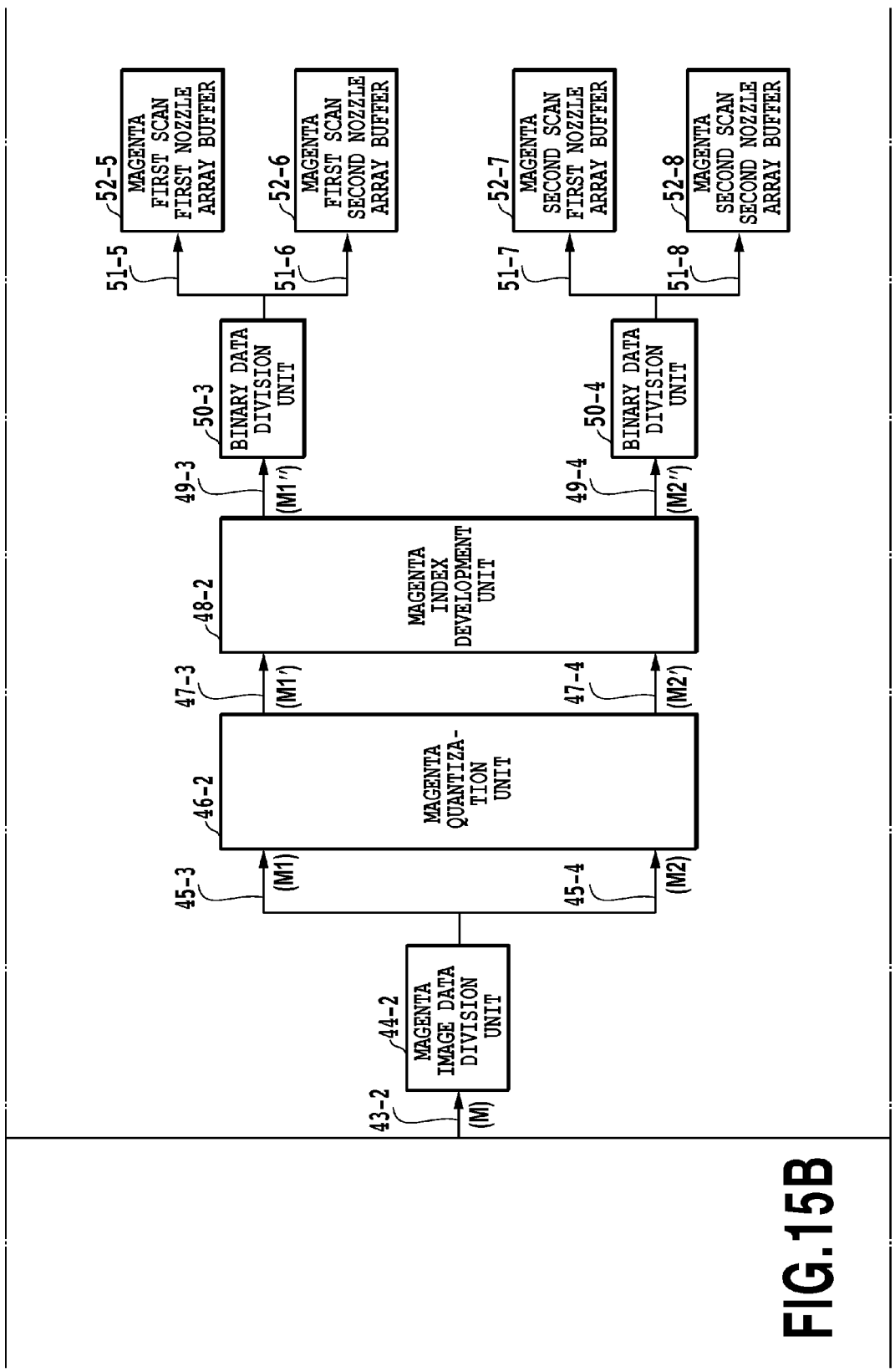
FIG. 15B is a block diagram showing image processing in a fifth embodiment.
Figure 15C:
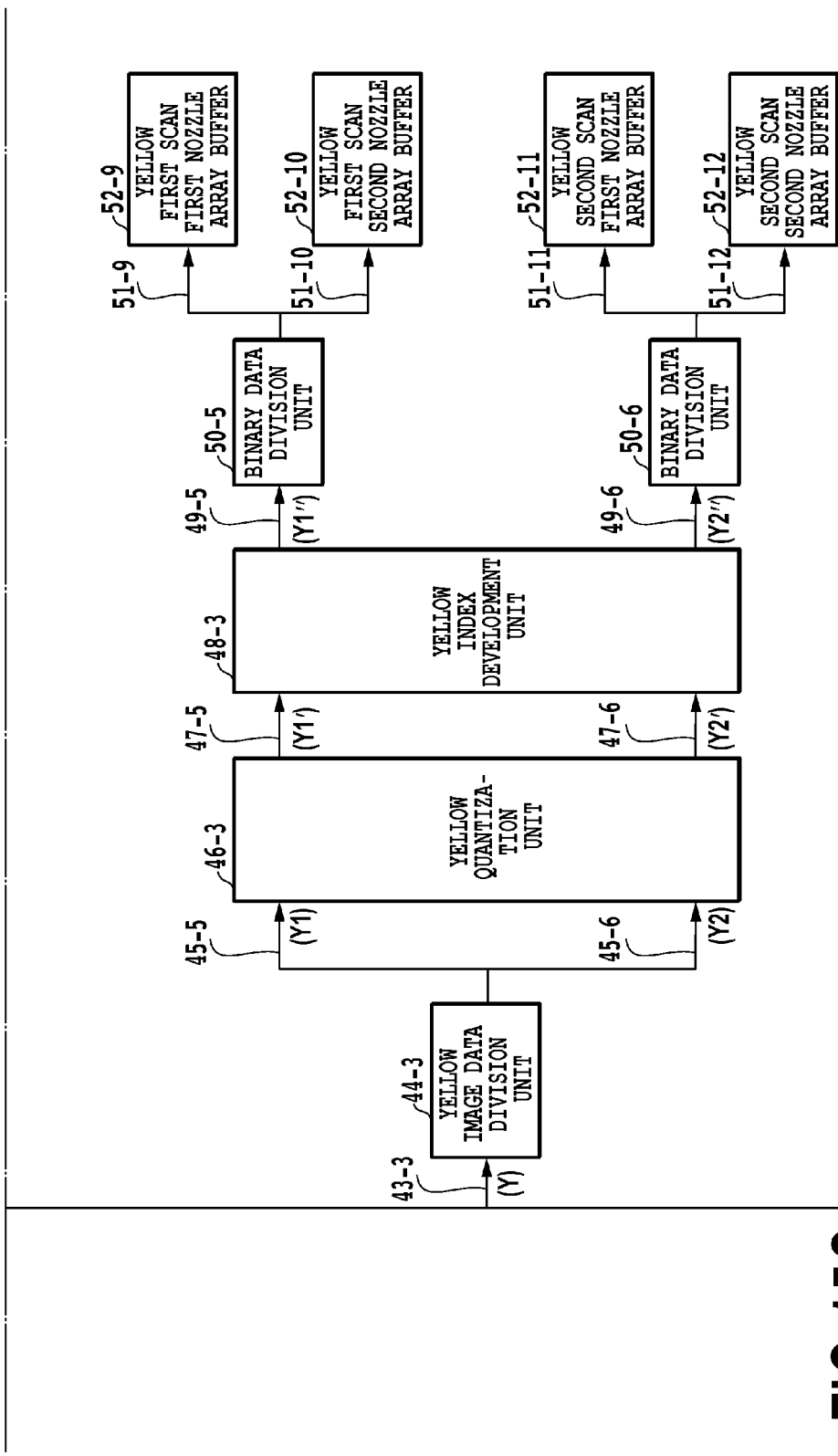
FIG. 15C is a block diagram showing image processing in a fifth embodiment.
Figure 15D:
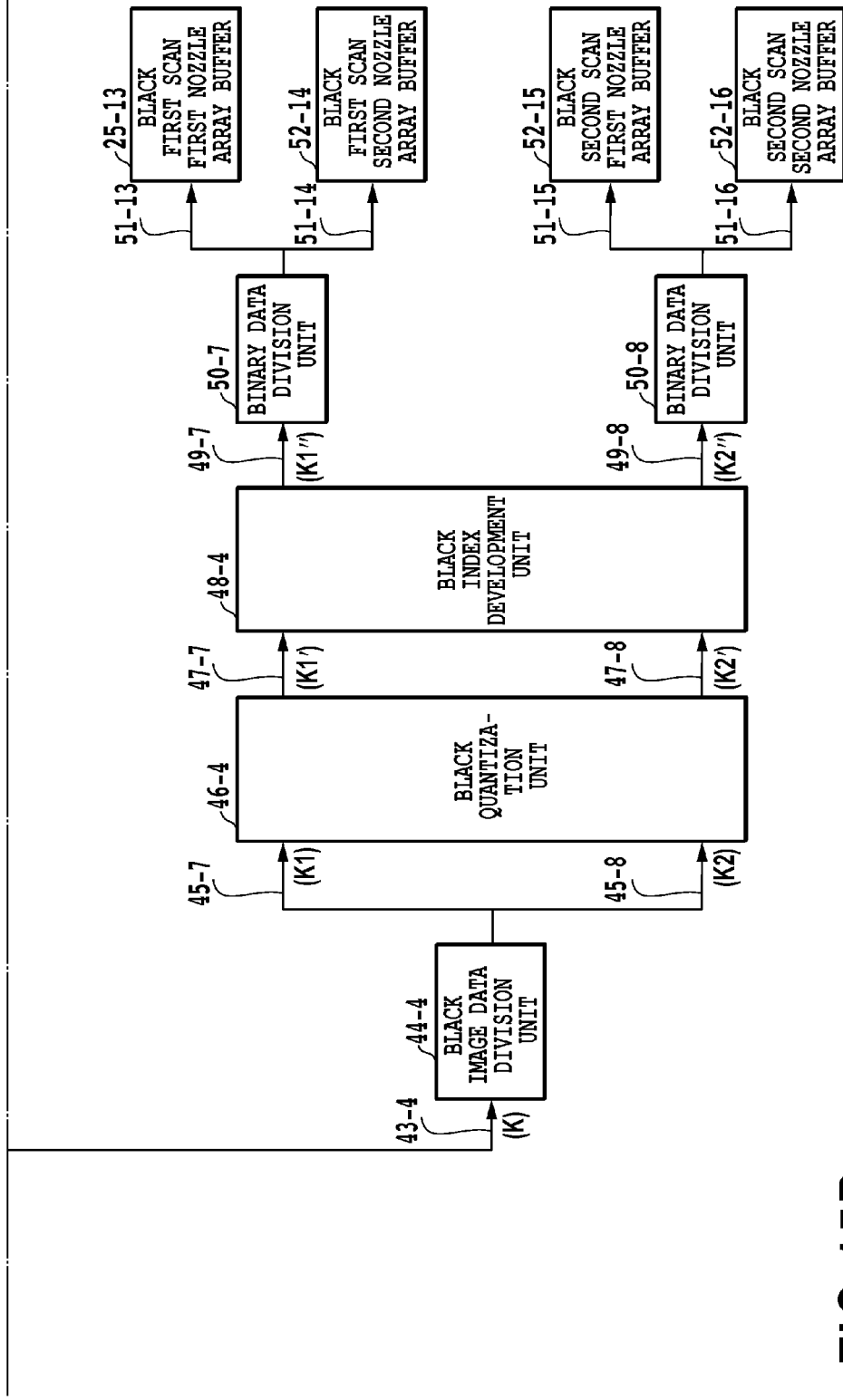
FIG. 15D is a block diagram showing image processing in a fifth embodiment.

FIG. 14 shows a relation between the result of performing quantization (into 3-value data) by the quantization unit 46-4 (K1 and K2) and the input values (K1*ttl* and K2*ttl*), as in FIGS. 13A to 13G. In the figure, the values of K1' and K2' represent the numbers of dots printed in the pixel of interest by the first printing scan and the second printing scan, respectively. Here, the first threshold used in the quantization of K2*ttl* is shown as a thick dotted line and the second threshold as a thick dashed line.

A pixel of interest where both of K1' and K2' have "2", for example, is printed with two dots by the first printing scan and two dots by the second printing scan. In a pixel of interest with K1' being "1" and K2' being "2", one dot is printed by the first scan and two dots by the second scan. In a pixel of interest with both K1' and K2' being "0", no dot is printed.

Although only an example of FIG. 14 is shown here, this embodiment, too, prepares the first threshold table and the second threshold table independently for each ink color. This can differentiate the quantized result among different ink colors, thereby enabling the dot overlap rate to be adjusted appropriately for each ink color.

Referring again to FIGS. 15A to 15D, the three-value image data K1' and K2' quantized by the black quantization unit 46-4 are sent to the printer engine 3004 where they are subjected to an indexing development operation by a black index development unit 48-4. The similar operation is also performed for other ink colors. The index development operation binarizes the L-value quantized data (L is an integer equal to or greater than 3) and can be taken as part of the quantization operation.

More specifically, the three-value image data K1' is converted by the black index development unit 48-4 into first scan binary data K1" 49-7 which is then transferred to a black first scan binary data division unit 50-7. The three-value image data K2' is converted by the black index development unit 48-4 into second scan binary data K2" 49-8 which is then transferred to a black second scan binary data division unit 50-8. The index development operation will be detailed later.

The black first scan binary data division unit 50-7 divides the binary data in two for the two nozzle arrays 54, 55 capable of ejecting black ink by using a mask stored in memory beforehand. The black second scan binary data division unit 50-8 divides the binary data in two for the two nozzle arrays 54, 55 capable of ejecting black ink by using a mask stored in memory beforehand.

After the dividing operation described above, black first scan first nozzle array binary data 51-13 is stored in a black first scan first nozzle array buffer 52-13 and then printed by the nozzle array 54 in the first scan. Black first scan second nozzle array binary data 51-14 is stored in a black first scan second nozzle array buffer 52-14 and then printed by the nozzle array 55 in the first scan. Black second scan first nozzle array binary data 51-15 is stored in a black second scan first nozzle array buffer 52-15 and then printed by the nozzle array 54 in the second scan. Further, black second scan second nozzle array binary data 51-16 is stored in a black second scan second nozzle array buffer 52-16 and then printed by the nozzle array 55 in the second scan.

Figure 16:
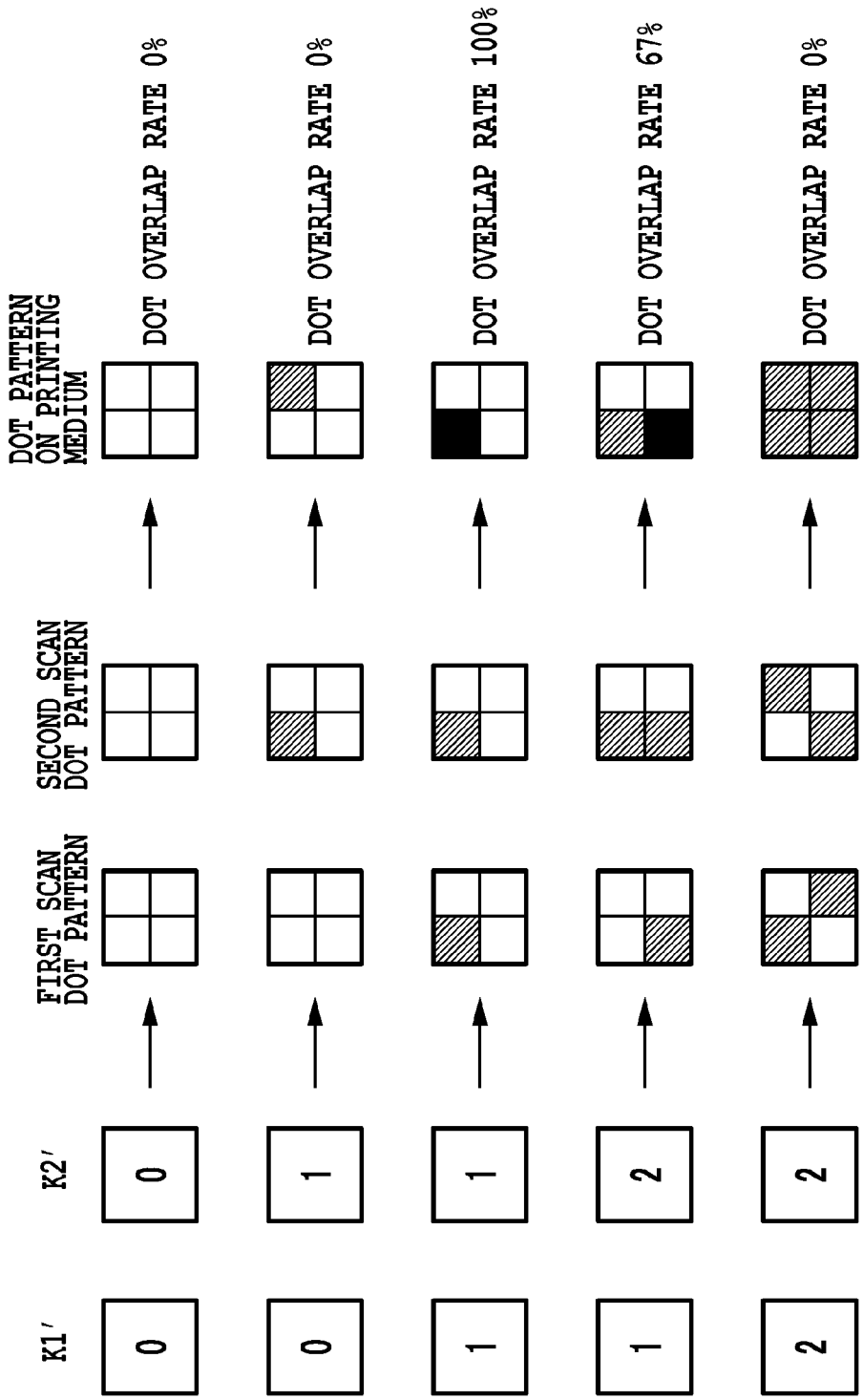
FIG. 16 is a diagram showing a relation between an index pattern and a dot overlap ratio.

FIG. 16 shows the index development operation and example index patterns (dot patterns) in this embodiment. In this figure, two pieces of input multivalue data to be binarized for whatever ink color are represented by K1' and K2'. That is, in the case of cyan, K1' and K2' are equivalent to C1' and C2' and, in the case of magenta, M1' and M2'.

The index development units 48-1 to 48-4 in this embodiment convert the three-value image data K1', K2' for one pixel into binary image data (dot pattern) for a 2-subpixel-by-2-subpixel area. In more detail, the three-value image data K1' having one of three values—0, 1 and 2—is converted into a dot pattern for the first scan. Similarly, the three-value image data K2' having one of the three values 0, 1, 2 is converted into a dot pattern for the second scan. Then, the first scan dot pattern and the second scan dot pattern superimposed together (shown at the rightmost column in the figure, described as "dot pattern formed on a print medium") are printed in one pixel. As to the dot patterns for the first and the second scan, shaded squares represent data "1" that instructs the printing of a dot in subpixels and blank squares represent data "0" that instructs the non-printing of a dot in subpixels. As to the dot patterns on a print medium, black squares represent subpixels in each of which two dots are printed, shaded squares represent subpixels in each of which one dot is printed, and blank squares represent subpixels in each of which no dot is formed.

Here, a dot overlap rate, which results from the image processing that converts three or higher-value image data for a pixel into a binary subpixel dot pattern for m×n subpixels making up the one pixel, will be explained by referring to FIG. 16. Such a "dot overlap rate" refers to a percentage of dots to be printed at the same subpixel positions in a pixel area by different scans (or by different printing element groups) with respect to a total number of dots to be printed in one pixel area composed of a plurality of subpixels. More specifically, if both K1' and K2' are "0", no dots are printed either in the first printing scan or the second printing scan and thus the dot overlap rate is 0%. If either K1' or K2' is "0", dots are printed in only one of the two scans and the dot overlap rate remains 0%. If both K1' and K2' are "1", two dots are printed overlappingly in an upper left subpixel of the 2-subpixel-by-2-subpixel area and the dot overlap rate is 100% (=2÷2×100). If one of K1' and K2' is "1" and the other is "2", two dots are printed overlappingly in a lower left subpixel of the 2-subpixel-by-2-subpixel area and one dot is printed in an upper left subpixel. So, the dot overlap rate is 67% (=2÷3×100). Further, if both K1' and K2' are "2", shaded subpixels do not overlap and the dot overlap rate is 0%. That is, by preparing index patterns (dot patterns) beforehand that provide one-to-one match with different levels shown in FIG. 16, a combination of K1' and K2' is determined in the quantization operation shown in FIG. 14, which in turn uniquely determines the dot overlap rate in the pixel area.

Next, a relation between the dot overlap rate and the density region in this embodiment will be explained by referring to FIG. 16. In the example of FIG. 16, one pixel can be printed with up to four dots. So, a printing rate of 100% refers to a pixel printed with four dots. If K1'=0 and K2'=0, the printing rate is 0%; if K1'=1 (or 0) and K2'=0 (or 1), the printing rate is 25%. If K1'=1 and K2'=1, the printing rate is 50%. Where K1'=1 (or 2) and K2'=2 (or 1), the printing rate is 75%. Where K1'=2 and K2'=2, the printing rate is 100%. In low-density region with print duties of 0% and 25%, the dot overlap rates are 0%. In medium-density region with a printing rate of 50%, the dot overlap rate is 100%. In high-density region with print duties of 75% and 100%, the dot overlap rates are 67% and 0% respectively.

As described above, in the index patterns, the positions and the number of dots to be printed are differentiated between the first scan dot pattern and the second scan dot pattern prepared beforehand in order to adjust the dot overlap rate at each level of gradation. Further, by preparing the first scan dot pattern and the second scan dot pattern for each of the color-specific index development units 48-1 to 48-4, the dot overlap rates can be differentiated among different ink colors. In this embodiment, although the dot overlap rates for individual ink colors can be adjusted by differentiating the threshold tables in the quantization units 46-1 to 46-4, they can also be adjusted by changing the index patterns. Take a black ink for example. As shown in FIG. 16, in medium density region (K1'=K2'=1), where density unevenness is considered likely to occur, the dot overlap rate can be set high. In high density region (K1'=K2'=2) where there are concerns for insufficient density, the dot overlap rate can be set low. As for cyan, by using index patterns different from those of FIG. 16, the dot overlap rate can be set high in high density region (C1'=C2'=2) and, in medium density region (C1'=C2'=1), can be set low. That is, by preparing a plurality of different index patterns, a dot overlap rate optimal for any particular ink color can be realized.

As described above, this embodiment prepares different dot patterns for different ink colors that are used in converting multivalue data—whose grayscale multivalue range has been reduced by the quantization unit—into binary data conforming to the printing resolution. This makes it possible to realize a dot overlap rate suited for any particular level of gradation and for any particular ink color, allowing for the printing of a satisfactory image free from density unevenness, graininess or insufficient density in the entire color gamut.

Other Embodiments

Figure 11B:
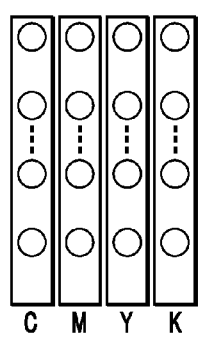

Although the preceding embodiments have been described to have two nozzle arrays for each ink color, as shown in FIG. 11A, this invention is not limited to this print head. It is also possible for the print head to have only one nozzle array for each color, as shown in FIG. 11B. In that case, the preceding embodiments do not perform the masking operation and subsequent processing. This construction, too, can offer the advantage of this invention of being able to adjust the dot overlap rate between the first and the second scan.

Figure 11C:
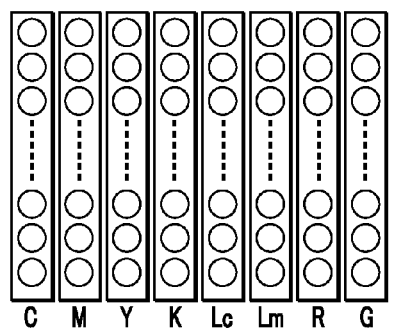
Figure 12B:
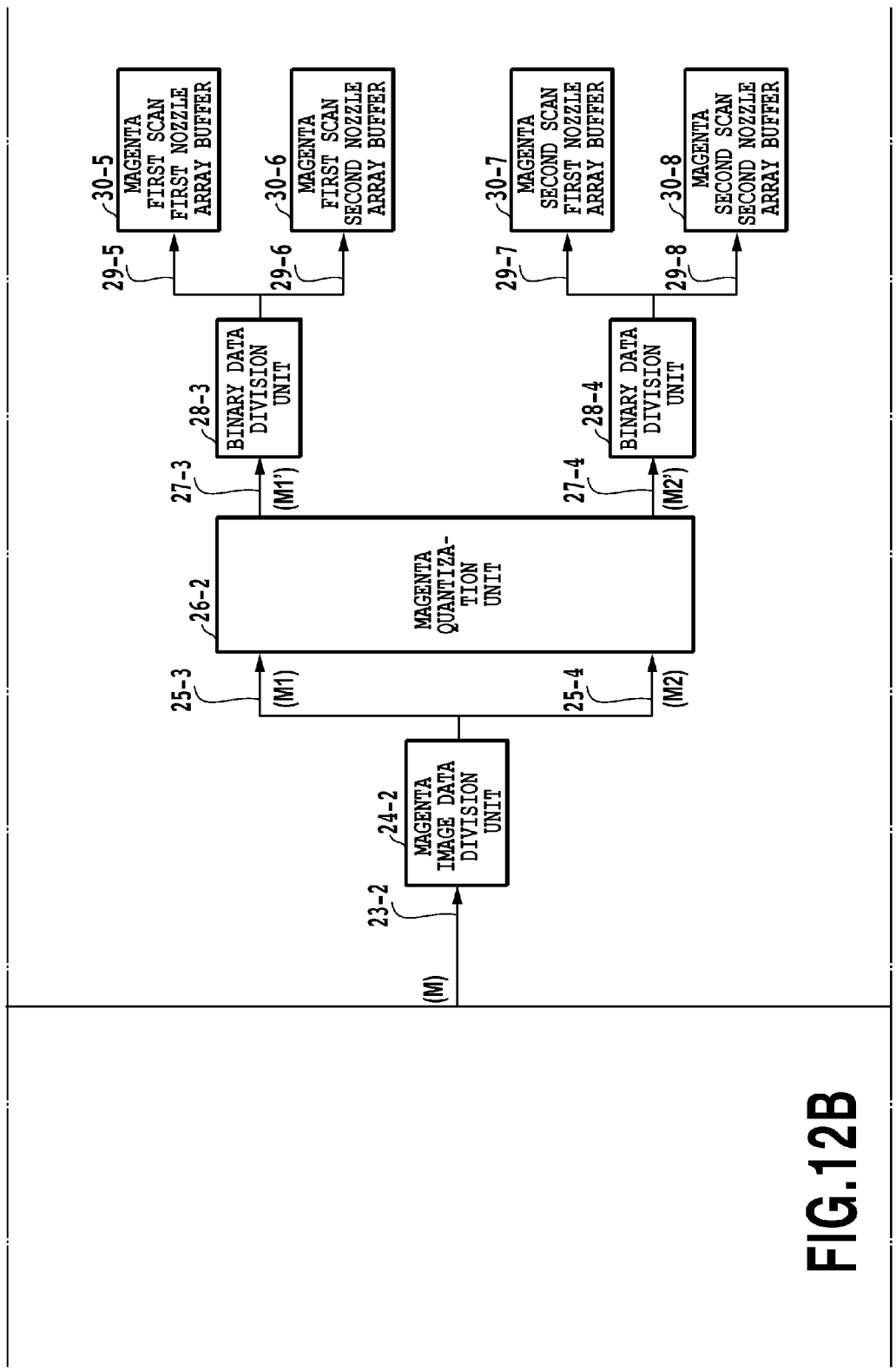
FIG. 12B is a block diagram showing image processing performed in a fourth embodiment.
Figure 12C:
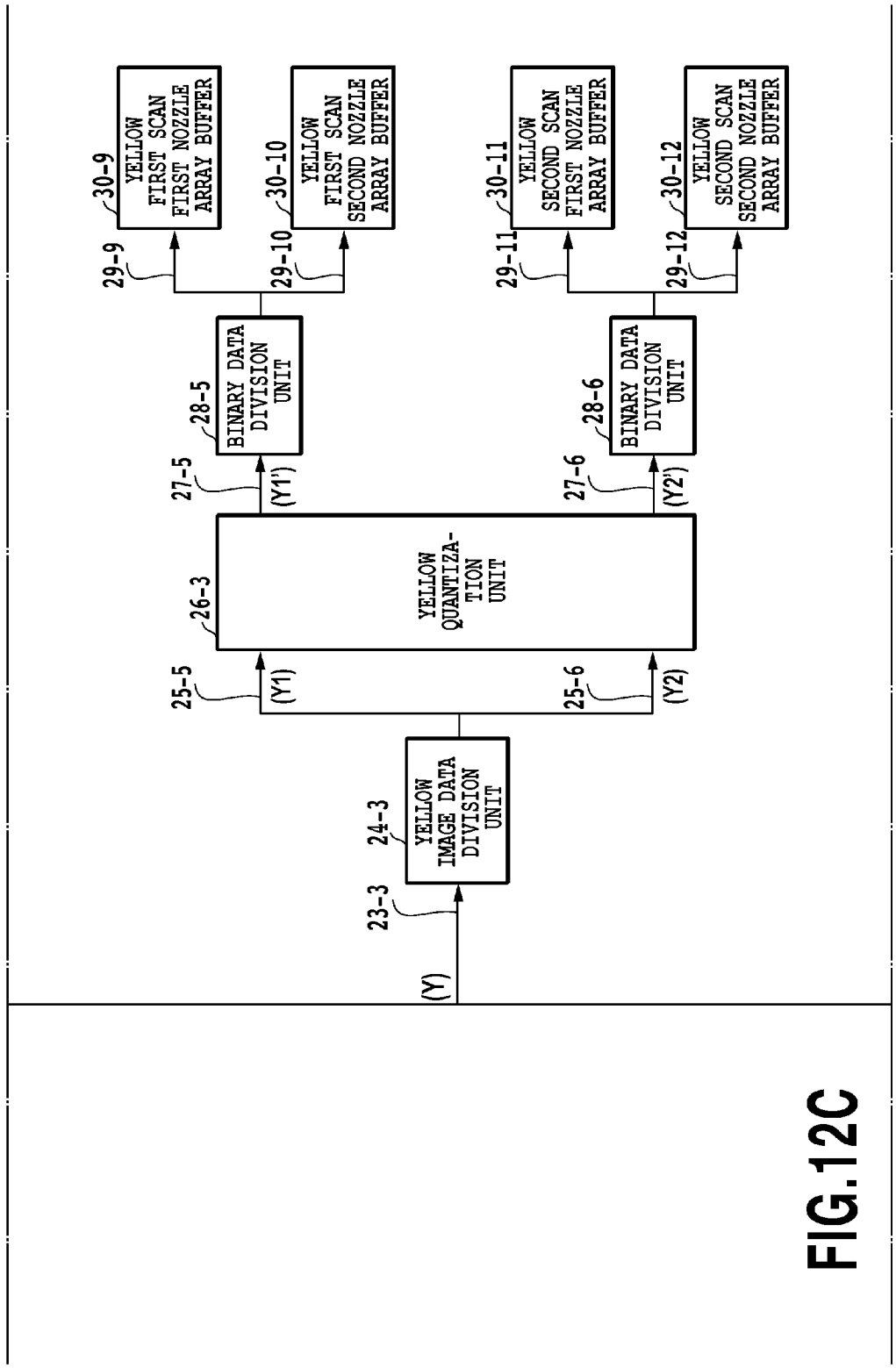
FIG. 12C is a block diagram showing image processing performed in a fourth embodiment.
Figure 12D:
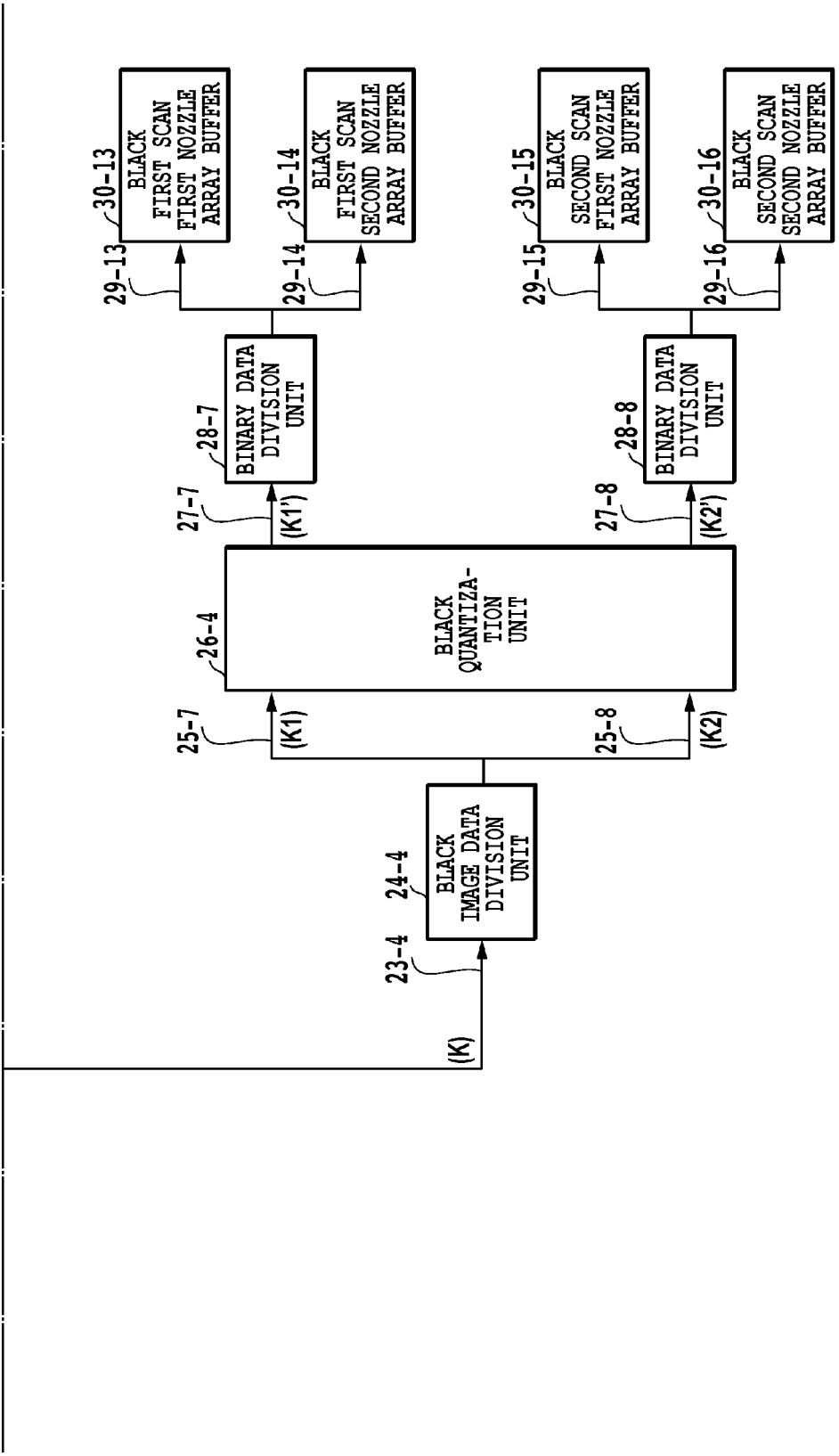
FIG. 12D is a block diagram showing image processing performed in a fourth embodiment.

While the above embodiments have been described to use four color inks C, M, Y, K, the number of kinds of ink colors that can be used in this invention is not limited to four. As shown in FIG. 11C, light cyan (Lc) and light magenta (Lm) inks or red (R) and blue (B) inks may also be used in addition to the four colors. Conversely, this invention is also applicable to a mono-color mode using a single color ink. Further, in addition to the color printers, this invention is also applicable to monochromatic printers. The aforementioned control may be performed in all of the different kinds of ink (e.g., four color inks C, M, Y, K) or applied to only two or more kinds of ink. While the preceding embodiments have been described to perform the 2-pass printing that completes an image in an area of interest (e.g., pixel area) by two scans of print head over a print medium, this invention is not limited to the 2-pass printing. This invention can be applied widely to M-pass printing operations (M is an integer equal to or greater than 2), i.e., three and greater number-pass printing operations can also be performed. If an M-pass printing is to be executed using N kinds of ink, N pieces of color-specific multivalue density data are first generated from input image data (RGB). Then, from each piece of the multivalue data, M sets of multivalue data are produced that correspond to M relative movements or M printing scans. Next, N×M sets of multivalue density data are each quantized to generate N×M sets of quantized data corresponding to the N ink colors and the M printing scans. Then, according to the N×M sets of quantized data, M printing scans are executed for each of the N ink colors to form an image in the area of interest. If, in the M-pass printing, the control of dot overlap rate explained in the fourth and the fifth embodiment is to be executed, the threshold table will be represented in M dimensions using K1$ttl$ to K1$ttl$ as coordinate axes, rather than in two dimensions as it is represented in FIGS. 13A to 13G and FIG. 14.

In 3 or higher number-pass printing mode (M-pass mode), it is not essential to generate M sets of multivalue data but P sets of multivalue data (P is an integer equal to or greater than 2 but less than M) may be generated. In that case, P sets of image data, fewer than M sets, may first be generated, followed by the quantization of P sets of density data to produce P sets of quantized data. Then, of the P sets of quantized data, at least one set of quantized data may be divided to produce M sets of quantized data for M passes.

Further, in the preceding embodiments, the dot overlap rate between different printing scans has been described to be adjusted on the assumption that the print position shift caused by different printing scans is greater than that caused by two nozzle arrays (54, 55). If the print position shift between the two nozzle arrays is greater than that caused by different printing scans, the two dividing operations on the image data in the preceding embodiments may be reversed. That is, the color-specific image data division unit may first divide the multivalue data into portions for respective nozzle arrays and then the masking unit may divide the quantized binary data into portions for respective printing scans. This arrangement is also effectively applied, for example, to a 1-pass printing operation using the print head of FIG. 11A.

In the preceding embodiments, although the image processing up to the quantization operation has been described to be performed by the control unit 3000 and the subsequent operations by the printer engine 3004, this invention is not limited to this arrangement. As long as the sequence of operations described above is executed, whether by hardware or software, any arrangement falls within the scope of this invention.

While the preceding embodiments have described as an example the printing apparatus (image forming apparatus) having the control unit 3000 with an image processing function, this invention is not limited to this configuration. The image processing, the feature of this invention, may be executed by a host device having a printer driver installed therein (e.g., PC 3010 in FIGS. 3A to 3D), followed by the quantized or divided image data being entered into the printing apparatus. In that case, the host device (external device) connected to the printing apparatus constitutes the image processing apparatus of this invention.

This invention is also realized by program codes making up a computer-readable program that realizes the above image processing function, or by a storage medium containing them. In that case, the image processing is implemented by a computer (or CPU or MPU) in the host device or image forming apparatus reading and executing the program codes. So, the computer-readable program to cause the computer to execute the image processing, and the storage medium containing that program are also included in this invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-072193, filed Mar. 26, 2010, which is hereby incorporated by reference herein in its entirety.

What is claimed is:

1. An image processing apparatus to process input image data for a pixel area to print on the associated pixel area of a print medium by a plurality of relative movements between a printing unit and the print medium, the printing unit being adapted to print dots by using a first ink and a second ink with different levels of brightness, the image processing apparatus comprising:

an obtaining unit configured to obtain a first multivalue data based on the input image data corresponding to the first ink and a second multivalue data based on the input image data corresponding to the second ink;

a conversion unit configured to convert each of the first multivalue data and the second multivalue data into a plurality of multivalue data corresponding to the plurality of relative movements; and a quantization unit configured to quantize each of the plurality of pieces of multivalue data corresponding to the first ink and the second ink, wherein at least one of the conversion unit and the quantization unit performs converting or quantizing such that a percentage of the number of dots to be overlappingly printed at the same positions in the pixel area by the plurality of relative movements, with respect to a total number of dots to be printed in the pixel area by the plurality of relative movements, is differentiated between at the first ink and the second ink.

2. The image processing apparatus according to claim 1, wherein, in order to differentiate the percentage between at the first ink and the second ink, the conversion unit converts the first multivalue data and the second multivalue data so that a bias of distribution ratio among the plurality of multivalue data which is converted from the first multivalue data or the second multivalue data is differentiated between at the first ink and the second ink.

3. The image processing apparatus according to claim 1, wherein the plurality of multivalue data corresponding to the plurality of relative movements for each of the first ink and the second ink include a multivalue data for a first scan of the plurality of relative movements, and a multivalue data for a second scan of the other relative movements, and
wherein the quantization unit quantizes, for each of the first ink and the second ink, the second multivalue data based on the first multivalue data and also the first multivalue data based on the second multivalue data so that the percentage is differentiated between at the first ink and the second ink.

4. The image processing apparatus according to claim 3, wherein the quantization operation is an error diffusion operation, and
wherein the quantization unit determines, based on the second multivalue data, a threshold for the error diffusion operation on the first multivalue data and quantizes the first multivalue data by using the determined threshold, and also determines, based on the first multivalue data, a threshold for the error diffusion operation on the second multivalue data and quantizes the second multivalue data by using the determined threshold.

5. The image processing apparatus according to claim 1, wherein the quantization unit includes:
a unit which generates, for each of the first ink and the second ink, a plurality of pieces of L-value quantized data corresponding to the plurality of relative movements by an L-value (L is an integer equal to or greater than 3) quantization operation; and
a unit which converts, for each of the first ink and the second ink, each of the plurality of pieces of L-value quantized data through dot patterns into binary data so that the percentage is differentiated between at the first ink and the second ink.

6. The image processing apparatus according to claim 1, wherein the first ink is one of cyan, magenta or black ink and the second ink is yellow ink, and
wherein the processing unit processes the input image data so that the percentages of the first ink is greater than the percentage of the second ink.

7. The image processing apparatus according to claim 1, wherein the first ink has lower brightness than that of the second ink, and
wherein the processing unit processes the input image data so that, the percentage of the first ink is greater than that of the second ink.

8. The image processing apparatus according to claim 1, wherein the image processing apparatus further comprises:
a second quantization unit configured to quantize the other multivalue data that corresponds to an ink different from the first ink and the second ink; and
a second conversion unit configured to convert the quantized data produced by the second quantization unit into a plurality of quantization data corresponding to the plurality of relative movements.

9. The image processing apparatus according to claim 8, wherein the ink different from the first ink and the second ink is yellow ink or photo ink.

10. The image processing apparatus according to claim 8, wherein the ink different from the first ink and the second ink has higher brightness than that of the first ink and the second ink.

11. A storage medium storing a computer-readable program, wherein the computer-readable program causes a computer to function as the image processing apparatus claimed in claim 1.

12. An image processing method to process input image data for a pixel area to print on the associated pixel areas of a print medium by a plurality of relative movements between a printing unit and the print medium, the printing unit being adapted to print dots by using a first ink and a second ink with different levels of brightness, the image processing method comprising:
an obtaining step to obtain a first multivalue data based on the input image data corresponding to the first ink and a second multivalue data based on the input image data corresponding to the second ink;
a conversion step to convert each of the first multivalue data and the second multivalue data into a plurality of multivalue data corresponding to the plurality of relative movements; and
a quantization step to quantize each of the plurality of pieces of multivalue data corresponding to the first ink and the second ink,
wherein at least one of the conversion step and the quantization step performs converting or quantizing such that a percentage of the number of dots to be overlappingly printed at the same positions in the pixel area by the plurality of relative movements, with respect to a total number of dots to be printed in the pixel area by the plurality of relative movements, is differentiated between at the first ink and the second ink.

13. The image processing method according to claim 12, wherein the first ink is one of cyan, magenta or black ink and the second ink is yellow ink, and
wherein the processing step processes the input image data so that the percentages of the first ink is greater than the percentage of the second ink.

14. The image processing method according to claim 12, wherein the first ink has lower brightness than that of the second ink, and
wherein the processing step processes the input image data so that, the percentage of the first ink is greater than that of the second ink.

15. The image processing method according to claim 12, wherein the image processing method further comprises:
a second quantization step configured to quantize the other multivalue data that corresponds to an ink different from the first ink and the second ink; and
a second conversion step to convert the quantized data produced by the second quantization step into a plurality of quantization data corresponding to the plurality of relative movements.

* * * * *